United States Patent
Bessho

(10) Patent No.: US 10,418,671 B2
(45) Date of Patent: Sep. 17, 2019

(54) POWER SUPPLY DEVICE, POWER SUPPLY SYSTEM PROVIDED WITH SAID POWER SUPPLY DEVICE, AND SEPARATOR FOR BATTERY CELLS

(71) Applicant: SANYO Electric Co., Ltd., Osaka (JP)

(72) Inventor: Toshihiko Bessho, Tokyo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/573,587

(22) PCT Filed: Jul. 11, 2016

(86) PCT No.: PCT/JP2016/003270
§ 371 (c)(1),
(2) Date: Nov. 13, 2017

(87) PCT Pub. No.: WO2017/017914
PCT Pub. Date: Feb. 2, 2017

(65) Prior Publication Data
US 2018/0138560 A1    May 17, 2018

(30) Foreign Application Priority Data
Jul. 30, 2015  (JP) ................................ 2015-150282

(51) Int. Cl.
*H01M 10/613* (2014.01)
*H01M 2/10* (2006.01)
(Continued)

(52) U.S. Cl.
CPC ....... *H01M 10/613* (2015.04); *H01M 2/1077* (2013.01); *H01M 2/18* (2013.01);
(Continued)

(58) Field of Classification Search
CPC ......... H01M 10/6555; H01M 10/6557; H01M 10/647
See application file for complete search history.

(56) References Cited

U.S. PATENT DOCUMENTS 9,484,607 B2 * 11/2016 Lee ................... H01M 10/6557
2008/0160395 A1   7/2008 Okada et al.
(Continued)

FOREIGN PATENT DOCUMENTS

JP    2008-166191    7/2008
JP    2013-033668    2/2013

OTHER PUBLICATIONS

International Search Report of PCT application No. PCT/JP2016/003270 dated Sep. 13, 2016.

*Primary Examiner* — Amanda J Barrow
(74) *Attorney, Agent, or Firm* — Wenderoth, Lind & Ponack, L.L.P.

(57) ABSTRACT

A power supply device is provided with: a plurality of battery cells, each of which has a prismatic external form; a separator connected to each battery cell to cover at least a portion of the surface of the battery cell; and a fastening member that fastens a battery stack obtained by stacking the battery cells covered by the separator in a state where main surfaces face each other. The separator is formed from an insulating material which is elastically deformable, and provided with the main plate section covering the main surface of the battery cell disposed to face said section, a box-shaped covering section provided on a bottom part of the main plate section on a side of a first surface, and a corner covering section provided on a top part of the main plate section on the side of the first surface.

13 Claims, 17 Drawing Sheets

(51) Int. Cl.
*H01M 2/18* (2006.01)
*H01M 10/647* (2014.01)
*H01M 10/6563* (2014.01)
*H01M 10/6557* (2014.01)
*H01M 10/6555* (2014.01)

(52) U.S. Cl.
CPC ..... *H01M 10/647* (2015.04); *H01M 10/6555* (2015.04); *H01M 10/6557* (2015.04); *H01M 10/6563* (2015.04)

(56) References Cited

U.S. PATENT DOCUMENTS

| | | | |
|---|---|---|---|
| 2011/0135985 A1* | 6/2011 | Kim | H01M 10/02 |
| | | | 429/120 |
| 2013/0034764 A1 | 2/2013 | Ochi et al. | |
| 2013/0316211 A1* | 11/2013 | Kim | H01M 2/1077 |
| | | | 429/99 |
| 2014/0363720 A1* | 12/2014 | Ackermann | H01M 10/625 |
| | | | 429/120 |
| 2016/0036105 A1* | 2/2016 | Toshioka | H01M 2/1077 |
| | | | 429/120 |
| 2017/0012267 A1* | 1/2017 | Nishimura | H01M 2/18 |
| 2017/0054116 A1* | 2/2017 | Morisaku | H01M 2/10 |

* cited by examiner

POWER SUPPLY DEVICE, POWER SUPPLY SYSTEM PROVIDED WITH SAID POWER SUPPLY DEVICE, AND SEPARATOR FOR BATTERY CELLS

This application is a U.S. national stage application of the PCT International Application No. PCT/JP2016/003270 filed on Jul. 11, 2016, which claims the benefit of foreign priority of Japanese patent application 2015-150282 filed on Jul. 30, 2015, the contents all of which are incorporated herein by reference.

TECHNICAL FIELD

The present invention relates to a power supply device constructed by stacking battery cells, a power supply system provided with said power supply device, and a separator used for said power supply device for insulating the battery cells.

BACKGROUND ART

A power supply device using a secondary battery has been used for a power supply for driving a vehicle, for example. The power supply device mentioned above is provided with a plurality of battery cells 91 each having a prismatic external form, a plurality of separators 92, a pair of bind bars 95, and a pair of end plates 94, as illustrated in an exploded perspective view in FIG. 17. Each of separators 92 is interposed between adjacent battery cells 91. Battery cells 91 and separators 92 are stacked in an alternating fashion to form battery stack 99. Both end faces of battery stack 99 in the stacking direction of battery cells 91 are respectively covered by end plates 94. Respective bind bars 95 extend along the stacking direction of battery cells 91, and are fixed to end plates 94 on both ends of battery stack 99. A typical battery cell includes a conductive external case, positive and negative electrode plates, and an electrolyte. Due to the positive and negative electrode plates and the electrolyte being sealed in the conductive external case, the external case has a potential. Therefore, the surface of the external case needs to be insulated in order to prevent unexpected electrical conduction with the adjacent secondary battery or corrosion of the external case caused by dew condensation or other factors. For example, condensed water droplets may flow toward the bottom surface of the battery cell, and therefore, the bottom surfaces of the external cases need to be insulated from one another. Meanwhile, a fastening member such as a bind bar formed by bending a metal plate may be used for maintaining a battery stack obtained by stacking battery cells into a bound state. If the fastening member is formed from a metal, a structure for preventing electrical conduction between external cases through the fastening member has been demanded.

As the insulating structure, a configuration for covering the surface of an external case by an insulating sheet formed from resin such as polyethylene terephthalate (PET) has been known, for example (see PTL 1 and PTL 2 for example). Specifically, a shrink tube that can cover the surface of the external case in close contact therewith due to heat shrinkage has been used as such an insulating sheet. However, in the configuration in which the external case is covered by the insulating sheet described above, it is necessary that the insulating sheet is covered in advance on each of the battery cells. Therefore, this configuration entails problems of poor workability and rising production cost.

In addition, in a conventional power supply device constructed by stacking battery cells, a separator is interposed between the adjacent battery cells in stacking the battery cells, and therefore, the battery cells and separators need to be stacked in an alternating fashion as being positioned. This results in a complicated assembly work, entailing a problem of being unable to achieve efficient production.

CITATION LIST

Patent Literature

PTL 1: Unexamined Japanese Patent Publication No. 2013-033668

PTL 2: Unexamined Japanese Patent Publication No. 2008-166191

SUMMARY OF THE INVENTION

The present invention has been accomplished to solve such conventional problems. One of objects of the present invention is to provide a power supply device that enables insulation of surfaces of battery cells at low cost, a power supply system provided with said power supply device, and a separator for battery cells.

Still another object of the present invention is to provide: a power supply device that simplifies an insulating structure between battery cells while maintaining an insulated state between battery cells and a fastening member to effectively prevent a short circuit caused by condensed water or the like; a power supply system provided with said power supply device; and a separator for battery cells.

Still another object of the present invention is to provide: a power supply device that can be efficiently produced by simplifying an assembly operation for stacking battery cells in a process for producing the power supply device; a power supply system provided with said power supply device; and a separator for battery cells.

A power supply device according to one aspect of the present invention is provided with: a plurality of battery cells each having a prismatic external form with a thickness smaller than a width of a main surface; a separator connected to each of the battery cells to cover at least a portion of the surface of the battery cells; and a fastening member that fastens a battery stack constructed by stacking the battery cells covered by the separator in a state where the main surfaces face each other. The separator is formed from an elastically deformable insulating material, and has a main plate section that covers the main surface of the battery cell disposed to face said section, a box-shaped covering section provided on a bottom part of the main plate section on a side of a first surface of the main plate section for receiving and covering a bottom surface of the battery cell, and a corner covering section provided on a top part of the main plate section on the side of the first surface for covering a corner of a top surface of the battery cell.

The configuration described above in which the bottom surface of the battery cell is covered by the box-shaped covering section of a spacer without using a covering member such as a shrink tube can provide a benefit of being capable of effectively preventing a short circuit due to water generated by dew condensation or the like and accumulated on the bottom surface. In addition, the bottom surface of the battery cell is inserted into the box-shaped covering section of the separator and the corner of the top surface of the battery cell is covered and held by the corner covering section, whereby the battery cell can simply and easily be disposed on a fixed position of the separator with the surface of the battery cell being covered and insulated by the separator.

In the power supply device according to the present invention, a battery cell unit is constructed by attaching the separator on a fixed position of each of the battery cells with the bottom surface of the battery cell being inserted into the box-shaped covering section of the separator and the corner of the top surface of the battery cell being covered by the corner covering section, and the battery stack can be obtained by stacking the battery cell units.

According to the configuration in which the bottom surface of the battery cell is inserted into the box-shaped covering section of the separator and both corners of the top surface of the battery cell are covered and held by the corner covering section, the battery cell unit having the separator attached on a fixed position of the battery cell can simply and reliably be obtained. Therefore, during a manufacturing process, operations of storage, conveyance, and assembly can be performed on the battery cell unit basis having the separator being attached to the battery cell, and therefore, an operator can do his/her job with safety and security by using the battery cell having a shrinkless structure. Particularly in the assembly process, the battery stack is obtained by stacking battery cell units, each having the separator attached to the battery cell, whereby the assembly process can be simplified to improve productivity.

The power supply device according to the present invention can be configured such that the separator also has a side wall that defines the side surfaces of the box-shaped covering section and the corner covering section on the side surface of the main plate section on a side of the first surface, and a cutout is formed at the intermediate part of the side wall.

According to this configuration, the side surface of the battery cell to which the separator is attached is insulated as being covered by the side wall provided on the side surface of the main plate section of the separator on the first surface side, and further, the battery cell can easily be set on the separator by causing the main plate section of the separator to be easily deformed due to the cutout formed on the intermediate part of the side wall. For example, this separator enables the battery cell to be simply and easily set on a fixed position of the separator in such a way that the bottom surface of the battery cell is inserted into the box-shaped covering section with the main plate section being bent toward the opposite side of the first surface at the cutout formed on the side wall, and then, the corner of the top surface of the battery cell is guided to the corner covering section with the main plate section being returned to the original state.

The power supply device according to the present invention can be configured such that the separator has a first air blowing channel formed on the first surface of the main plate section for forming an air passage between the battery cells, which is to be stacked on a side of the first surface of the main plate section, and the main plate section, and openings on both ends of the first air blowing channel are communicated with the cutout.

The configuration described above in which the air passage for cooling the battery cell to be stacked on the first surface side of the main plate section is formed on the first surface side of the main plate section so as to communicate with the cutout on the side wall can implement a structure of causing the separator to be easy to be elastically deformed, while ensuring a path for a cooling gas.

The power supply device according to the present invention can be configured such that the separator has a second air blowing channel formed on a second surface of the main plate section which is opposite to the first surface for forming an air passage between the battery cell, which is to be stacked on a side of the second surface of the main plate section, and the main plate section, and openings on both ends of the second air blowing channel are formed along the side wall.

According to the configuration in which the air passage for cooling the battery cell to be stacked on the second surface side of the main plate section is formed on the second surface side of the main plate section along the side wall, a path for a cooling gas for cooling the battery cell can efficiently be ensured.

The power supply device according to the present invention can be configured such that the main plate section is provided with an oppositely extending side wall extending toward the second surface along the cutout, the oppositely extending side wall being formed into a shape engaged with the cutout of the adjacently disposed separator.

According to the configuration described above, the separators connected to the battery cells can mechanically be connected to each other through engagement between the separators in a stacked state by means of the oppositely extending side wall and the cutout. In addition, according to this configuration, the side surface of the battery cell can be almost entirely covered.

The power supply device according to the present invention can be configured such that the side wall has a vertical wall along the longitudinal direction, and the oppositely extending side wall has a vertical wall along the longitudinal direction.

According to this configuration, a creepage distance between the adjacent battery cells can be increased by the vertical walls formed on the side wall and the oppositely extending side wall, whereby an occurrence of an unexpected short circuit due to dew condensation or the like can effectively be prevented, and thus, insulating property between the battery cells can be enhanced.

The power supply device according to the present invention can be configured such that the fastening member has a pair of end plates disposed on both end faces of the battery stack and a bind bar having both ends connected to the pair of end plates, in which: the bind bar has a side surface plate section for covering the side surface of the battery stack, side surface plate section being formed with an air blowing opening facing the opening of the air passage; and the vertical walls formed on the side wall and the oppositely extending side wall are disposed in the air blowing opening.

According to the configuration in which the vertical walls formed on the side wall and the oppositely extending side wall are disposed in the air blowing opening formed on the bind bar disposed on the side surface of the battery stack, the creepage distance between the battery cell and the bind bar can be increased, whereby an unexpected short circuit between the battery cell and the bind bar due to dew condensation or the like can effectively be prevented. In addition, the configuration in which the vertical walls are disposed in the air blowing opening formed on the bind bar enables the cooling gas to flow in the opening of the air passage along the vertical walls, whereby a path for blowing air to the air passage can be ensured.

The power supply device according to the present invention can be configured such that the side wall and the oppositely extending side wall each have two rows of vertical walls on positions facing each other, and a continuous longitudinal channel is defined by two rows of the vertical walls facing each other. The bind bar is provided with a connection bar for reinforcing side surface plate section having the air blowing opening formed therein, side surface plate section being formed with a plurality of air blowing openings through the connection bar, and the connection bar can be inserted into the longitudinal channel.

According to this configuration, the side surface plate section having the air blowing openings formed therein is reinforced by the connection bar, and the connection bar is inserted into the longitudinal channel defined by the vertical walls formed on the side wall and the oppositely extending side wall, whereby an unexpected short circuit between the battery cell and the connection bar due to dew condensation or the like can effectively be prevented. In addition, the configuration in which the connection bar is disposed in the longitudinal channel can achieve effective cooling by preventing the forcibly blown cooling gas from being affected by the connection bar.

The power supply device according to the present invention can be configured to further include an insulating cover film for partially covering the battery cell, the cover film extending at least from the surface of the battery cell covered by the box-shaped covering section to the surface of the battery cell covered by the corner covering section on the battery cell covered by the separator.

According to this configuration, the bottom surface of the battery cell is covered by the box-shaped covering section of the separator, the corner of the top surface of the battery cell is covered by the corner covering section, and the battery cell is also covered by the insulating cover film from the surface of the battery cell covered by the box-shaped covering section to the surface of the battery cell covered by the corner covering section, whereby the region of the battery cell from the bottom surface to the top surface can be covered in an insulated state to prevent direct contact of a person or metal with the surface of the battery cell, and thus, an unexpected current flow can reliably be prevented.

The power supply device according to the present invention can be configured to be disposed in a horizontal position where both side surfaces of the battery stack are vertically directed.

According to the configuration described above, the bottom surface of the battery cell is covered by the box-shaped covering section of the separator and the corner of the top surface of the battery cell is covered by the corner covering section, whereby, even when the power supply device is disposed in a horizontal position where the both side surfaces of the battery stack are vertically directed, water generated by dew condensation or the like flows down along the inner surfaces of the box-shaped covering section and the corner covering section to effectively prevent a short circuit caused by condensed water. Particularly according to the structure in which the main plate section of the separator is provided with the side wall and the oppositely extending side wall which are provided with vertical walls, the vertical walls disposed on the lower surface side of the power supply device which is placed in a horizontal position increase the creepage distance of condensed water or the like flowing down along the inner surfaces of the box-shaped covering section and the corner covering section to effectively prevent an occurrence of an unexpected short circuit due to dew condensation or the like, whereby insulating property between the battery cells can be enhanced. In addition, since the power supply device is disposed with the top surfaces of the battery cells being horizontally directed, restriction regarding a load or the like with respect to the vertical direction can be reduced.

A power supply system according to the present invention can be configured to include a plurality of any one of the power supply devices described above, in which the power supply system includes at least a pair of power supply devices, each of which is disposed in a horizontal position where both side surfaces of the battery stack are vertically directed, the pair of power supply devices being disposed such that the bottom surfaces of the battery stacks face each other and the top surfaces of the battery cells are horizontally directed in opposite directions.

According to the configuration in which a pair of power supply devices is disposed in a horizontal position where both side surfaces of the battery stack are vertically directed with the bottom surfaces of the battery stacks facing each other, the pair of power supply devices is disposed with space being saved, while the electrode terminals of the battery cells can efficiently be wired by disposing the top surfaces of the battery cells to be horizontally directed in opposite directions.

A separator according to the present invention is used for a power supply device constructed by stacking a plurality of battery cells, each having a prismatic external form with a thickness smaller than a width of a main surface, for insulating a surface of each of the battery cells, the separator being provided with: a main plate section that covers the main surface of the battery cell disposed to face the main plate section; a box-shaped covering section provided on a bottom part of the main plate section on a side of a first surface of the main plate section for receiving and covering a bottom surface of the battery cell; and a corner covering section provided on a top part of the main plate section on the side of the first surface for covering a corner of a top surface of the battery cell, the separator being formed from an insulating material which is elastically deformable.

The configuration described above in which the bottom surface of the battery cell is covered by the box-shaped covering section of the separator without using a covering member such as a shrink tube can provide a benefit of being capable of effectively preventing a short circuit due to water generated by dew condensation or the like and accumulated on the bottom surface.

DESCRIPTION OF EMBODIMENT

Figure 1:
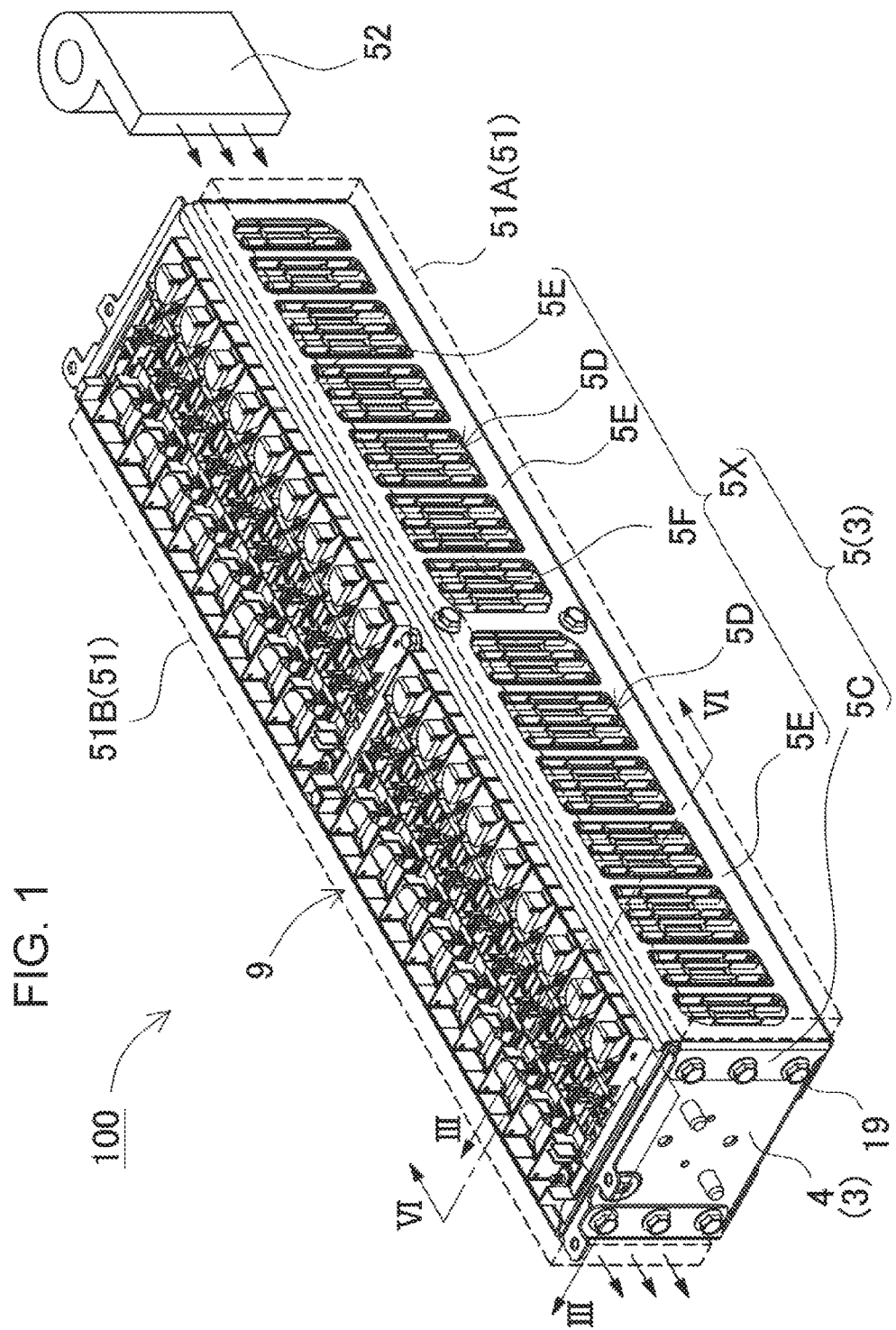
FIG. 1 is a perspective view of a power supply device according to one exemplary embodiment of the present invention.

Power supply device 100 according to one exemplary embodiment of the present invention is illustrated in FIGS. 1 to 4. Power supply device 100 illustrated in FIGS. 1 to 4 is provided with a plurality of battery cells 1 each having a prismatic external form, separators 2 each of which is connected to each of battery cells 1 to cover at least a portion of the surface of battery cell 1, and fastening member 3 that fastens battery stack 9 which is constructed by stacking the plurality of battery cells 1 covered by separator 2 in a state where main surfaces 1X face each other. The power supply device in FIGS. 1 to 4 has battery stack 9 constructed by stacking battery cell units 10, each of which is constructed by attaching separator 2 to battery cell 1 as illustrated in FIG. 5.

(Battery Cell 1)

Battery cell 1 is a prismatic battery with wide main surface 1X having a rectangular outer shape, and has a thickness smaller than the width of main surface 1X. Battery cell 1 is also a secondary battery which can be charged and discharged, and it is a lithium ion secondary battery. However, in the power supply device according to the present invention, the battery cell is not limited to the lithium ion secondary battery, and any other batteries which can be charged and discharged can also be used, such as a non-aqueous electrolyte secondary battery or a nickel-hydrogen battery cell other than the lithium ion secondary battery.

Figure 6:
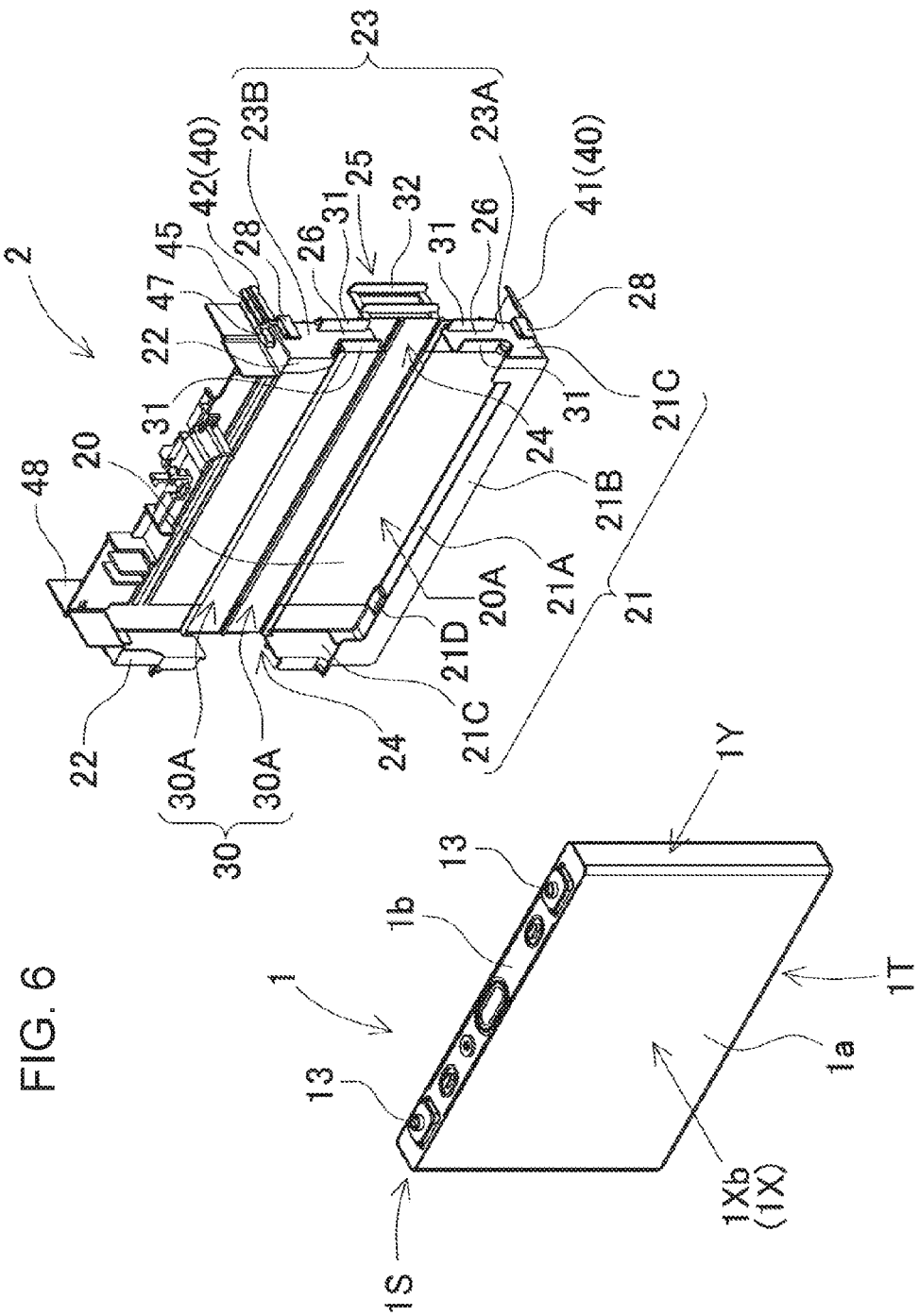
FIG. 6 is an exploded perspective view of a battery unit.

Battery cell 1 is configured such that external case 1a which stores an electrode assembly formed by stacking positive and negative electrode plates is filled with an electrolyte, and is sealed in an airtight manner. As illustrated in FIG. 6, external case 1a is molded into a columnar or pipe shape with a closed bottom, and an upper opening thereof is closed in an airtight manner by sealing plate 1b formed from a metal plate. External case 1a is formed by deep-drawing a metal plate made of aluminum, aluminum alloy, or the like. Sealing plate 1b is formed from a metal plate made of aluminum, aluminum alloy, or the like, in the same manner as external case 1a. Sealing plate 1b is inserted into the opening of external case 1a, and the boundary between the outer periphery of sealing plate 1b and the inner periphery of external case 1a is irradiated with a laser beam to fix sealing plate 1b to external case 1a in an airtight manner by laser welding.

As illustrated in FIG. 6, battery cell 1 is provided with positive and negative electrode terminals 13 fixed on both ends of sealing plate 1b so as to project therefrom. Positive and negative electrode terminals 13 are connected to built-in positive and negative electrode plates (not illustrated), respectively. Electrode terminals 13 fixed on the top surface of battery cell 1 are provided such that the positive electrode and the negative electrode are bilaterally symmetrical. Thus, battery cells 1 can be connected in series in such a way that they are horizontally reversed and stacked on each other, and the adjacent positive electrode terminal 13 and the negative electrode terminal 13 are connected to each other with a bus bar 17 made of a metal plate. The power supply device obtained by connecting battery cells 1 in series can increase an output voltage to increase an output. Notably, the power supply device can be configured such that the battery cells are connected in parallel and in series.

As illustrated in FIG. 5, battery cell 1 which is a prismatic battery has separator 2 attached thereto to form battery cell unit 10. Further, a plurality of battery cell units 10 is stacked in the thickness direction of battery cells 1 to construct battery stack 9. Note that, in the present specification, the vertical direction of battery cell 1 is specified in FIG. 6. In addition, side surface 1Y of battery cell 1 means a narrow surface on both sides of battery stack 9 which is formed by stacking battery cell units 10 in a state where main surfaces 1X which are wide surfaces face each other.

(Separator 2)

Separator 2 is formed from an insulating material, and as illustrated in FIGS. 3 to 9, it is connected to each battery cell 1 for insulating the surface of battery cell 1 by partially covering the same. Further, separator 2 holds battery cells 1 adjacent to each other at a set spacing, while insulating stacked battery cells 1 from each other. Such separator 2 is formed by molding an insulating material such as plastic. Particularly, separator 2 is made of a soft material having elasticity such as a plastic material including polypropylene (PP), silicon, or the like.

As illustrated in FIGS. 3 to 9, separator 2 has main plate section 20 that covers main surface 1X of battery cell 1 disposed to face said main plate section 20, box-shaped covering section 21 provided on a bottom part of main plate section 20 on a side of first surface 20A for receiving and covering bottom surface 1T of battery cell 1, and corner covering section 22 provided on a top part of main plate section 20 on the side of first surface 20A for covering corner 1S of a top surface of battery cell 1. This separator 2 holds battery cell 1 constructing one battery cell unit 10 at a fixed position in such a way that one of main surfaces 1X of battery cell 1 is covered by main plate section 20, bottom surface 1T of battery cell 1 is held by box-shaped covering section 21, and corner 1S of the top surface of battery cell 1 is held by corner covering section 22.

(Main Plate Section 20)

Figure 7:
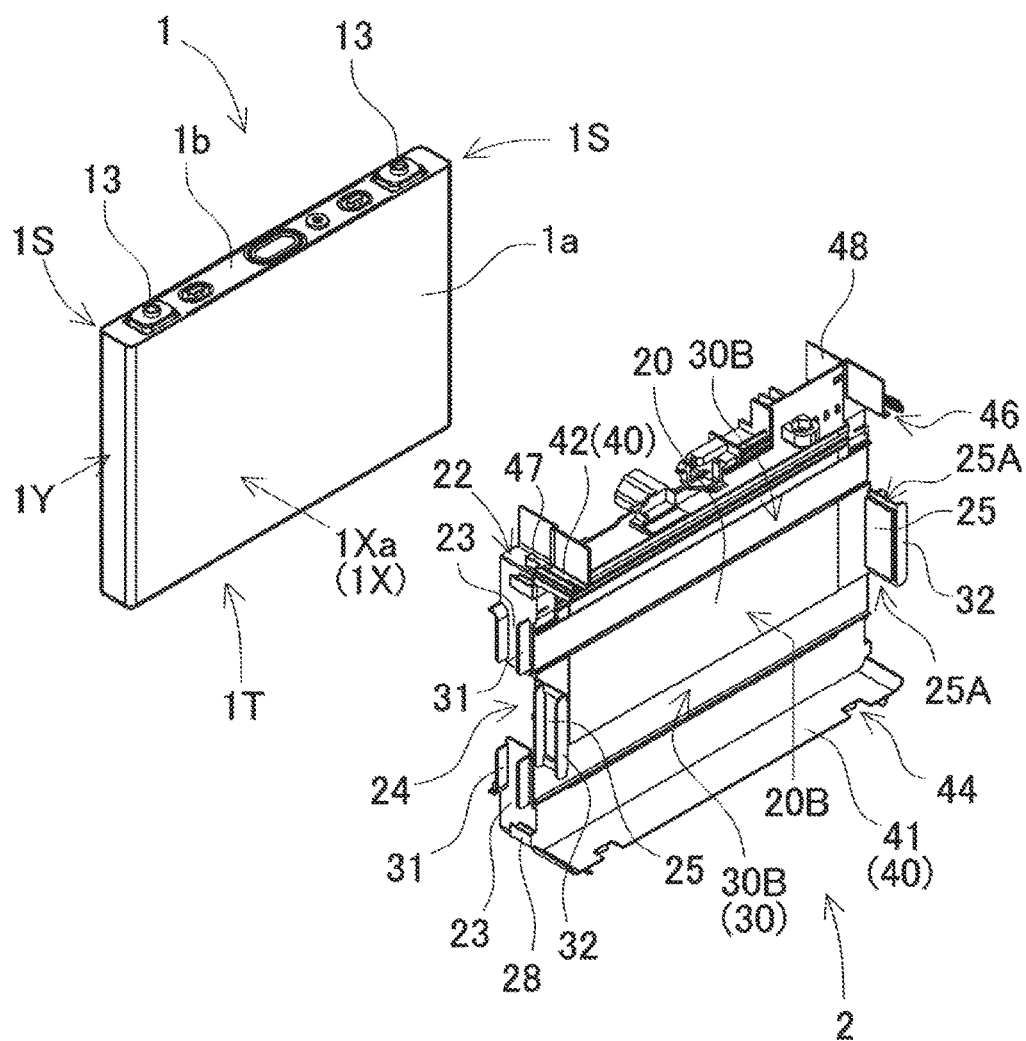
FIG. 7 is a back perspective view of the battery cell unit illustrated in FIG. 6.

As illustrated in FIGS. 6 and 7, main plate section 20 has a plate shape with a size and shape approximately same as those of main surface 1X of battery cell 1. Main plate section 20 has first surface 20A which is on the side where battery cell 1 constructing battery cell unit 10 is disposed. Box-shaped covering section 21 is provided on the bottom part on the side of first surface 20A and corner covering sections 22 are provided on both corners of the top part on the side of first surface 20A. Main plate section 20 also has second surface 20B which is opposite to first surface 20A. Second surface 20B is brought into contact with main surface 1X of battery cell 1 constructing adjacently stacked battery cell unit 10. Specifically, main plate section 20 of separator 2 to which battery cell 1 is set to construct battery cell unit 10 allows first main surface 1Xa of this battery cell 1 to be in contact with first surface 20A for covering first main surface 1Xa, and allows second main surface 1Xb of battery cell 1, which constructs adjacently stacked battery cell unit 10, to be in contact with second surface 20B for covering second main surface 1Xb.

(Box-Shaped Covering Section 21)

Box-shaped covering section 21 is formed into a box shape into which the bottom surface of battery cell 1 can be inserted. Box-shaped covering section 21 illustrated in FIGS. 6 to 9 has a box shape which is open at the top so as to receive and cover the entire bottom surface of prismatic battery cell 1. Box-shaped covering section 21 has bottom surface covering part 21A formed along the lower edge of main plate section 20 to protrude toward first surface 20A, front surface covering part 21B rising upward from the leading end of bottom surface covering part 21A, and side surface covering parts 21C connecting ends of main plate section 20, bottom surface covering part 21A, and front surface covering part 21B. Box-shaped covering section 21 is molded integrally with main plate section 20.

Box-shaped covering section 21 thus configured covers, by bottom surface covering part 21A, the bottom surface of battery cell 1 which is inserted along first surface 20A of main plate section 20, covers the bottom part of second main surface 1Xb of this battery cell 1 by front surface covering part 21B, and covers the bottom parts of both side surfaces 1Y by side surface covering parts 21C. Box-shaped covering section 21 having the structure described above covers entire bottom surface 1T of battery cell 1 inserted into box-shaped covering section 21 with no gap therebetween. Therefore, even if condensed water droplets or the like may flow toward the bottom surface side of battery cell 1, a short circuit caused by the water droplets can reliably be prevented because of box-shaped covering section 21 covering entire bottom surface 1T of battery cell 1.

Figure 3:
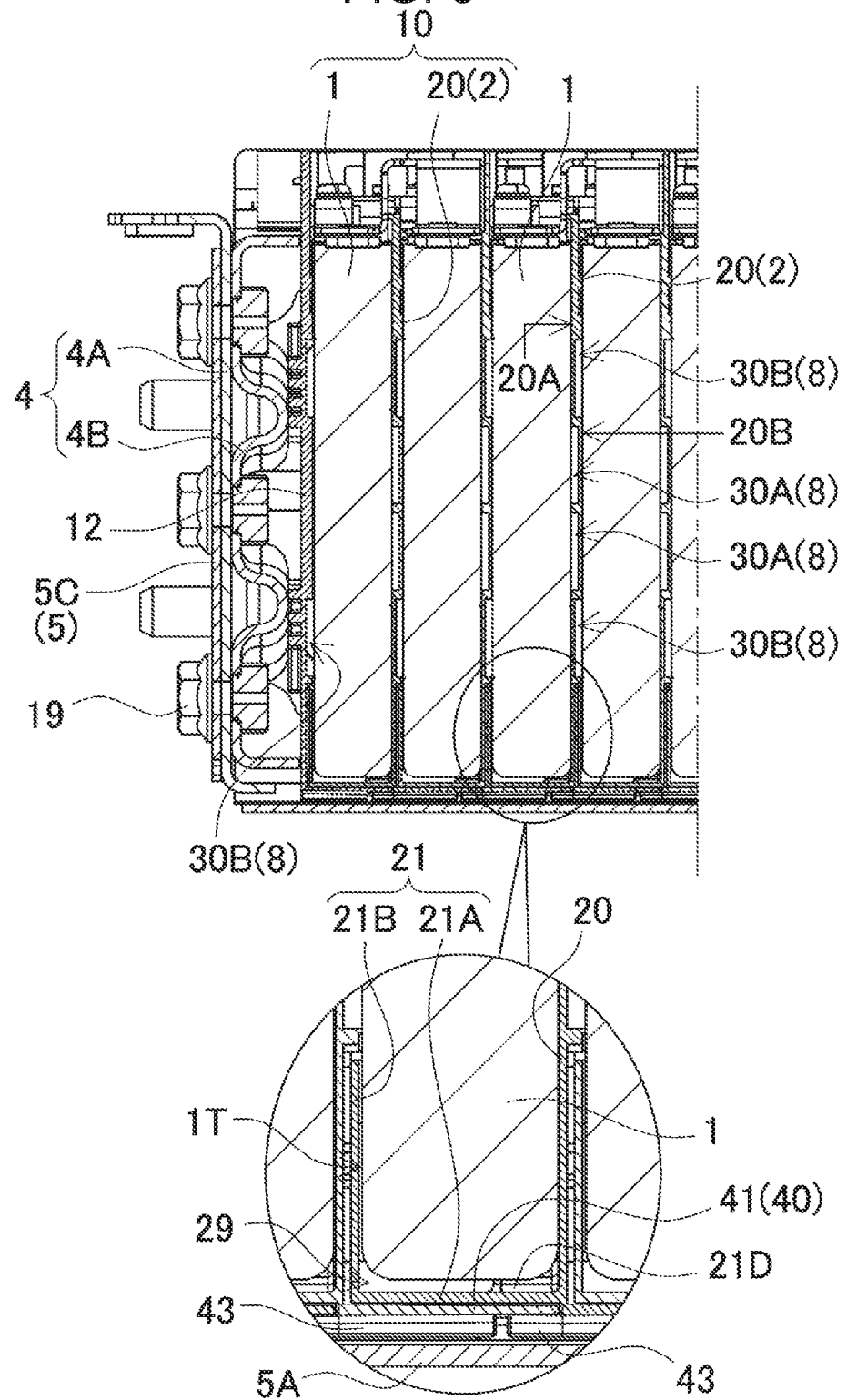
FIG. 3 is a sectional view of the power supply device illustrated in FIG. 1 taken along line III-III, a portion of which is enlarged.

In addition, box-shaped covering section 21 illustrated in FIGS. 3 and 6 is provided with stepped projections 21D projecting toward the inner surface on both ends of the inner surface of bottom surface covering part 21A. In a state where the bottom surface of battery cell 1 is brought into contact with stepped projections 21D, gap 29 is formed between the bottom surface of battery cell 1 and the inner surface of bottom surface covering part 21A. This structure causes water droplets flowing into box-shaped covering section 21 to flow into gap 29 and temporarily stay therein, thereby preventing the water droplets from flowing to the outside.

(Corner Covering Section 22)

Corner covering section 22 is configured to be capable of guiding corner 1S of the top surface of prismatic battery cell 1 and locking this corner 1S. As illustrated in FIGS. 6 to 9, corner covering section 22 is formed into a recessed shape obtained by removing one side surface from a box-shaped opening so as to allow corner 1S of prismatic battery cell 1 to be engaged therewith. Corner covering section 22 has top surface covering part 22A formed each on both side edges of the upper end of main plate section 20 to protrude toward first surface 20A, front surface covering part 22B extending downward from the leading end of front surface covering part 22A, and side surface covering part 22C connecting ends of main plate section 20, top surface covering part 22A, and front surface covering part 22B. Corner covering section 22 is molded integrally with main plate section 20.

Corner covering sections 22 thus configured cover, by top surface covering parts 22A, both ends of the top surface (sealing plate 1b) of battery cell 1 with bottom surface 1T being inserted into box-shaped covering section 21, cover both sides of the top part of second main surface 1Xb of this battery cell 1 by front surface covering parts 22B, and cover the top parts of both side surfaces 1Y by side surface covering parts 22C. When corner covering section 22 having the above-mentioned structure guides corner 1S of battery cell 1, front surface covering part 22B which is elastically deformed is externally turned up (see arrow C in FIG. 10) to widen the opening of the recess, so as to facilitate insertion of corner 1S of battery cell 1. In addition, in a state where corner 1S of battery cell 1 is guided along corner covering section 22, corner 1S of battery cell 1 can be positioned with the inner surfaces of top surface covering part 22A, front surface covering part 22B, and side surface covering part 22C being in contact with the surface of corner 1S of battery cell 1.

Figure 4:
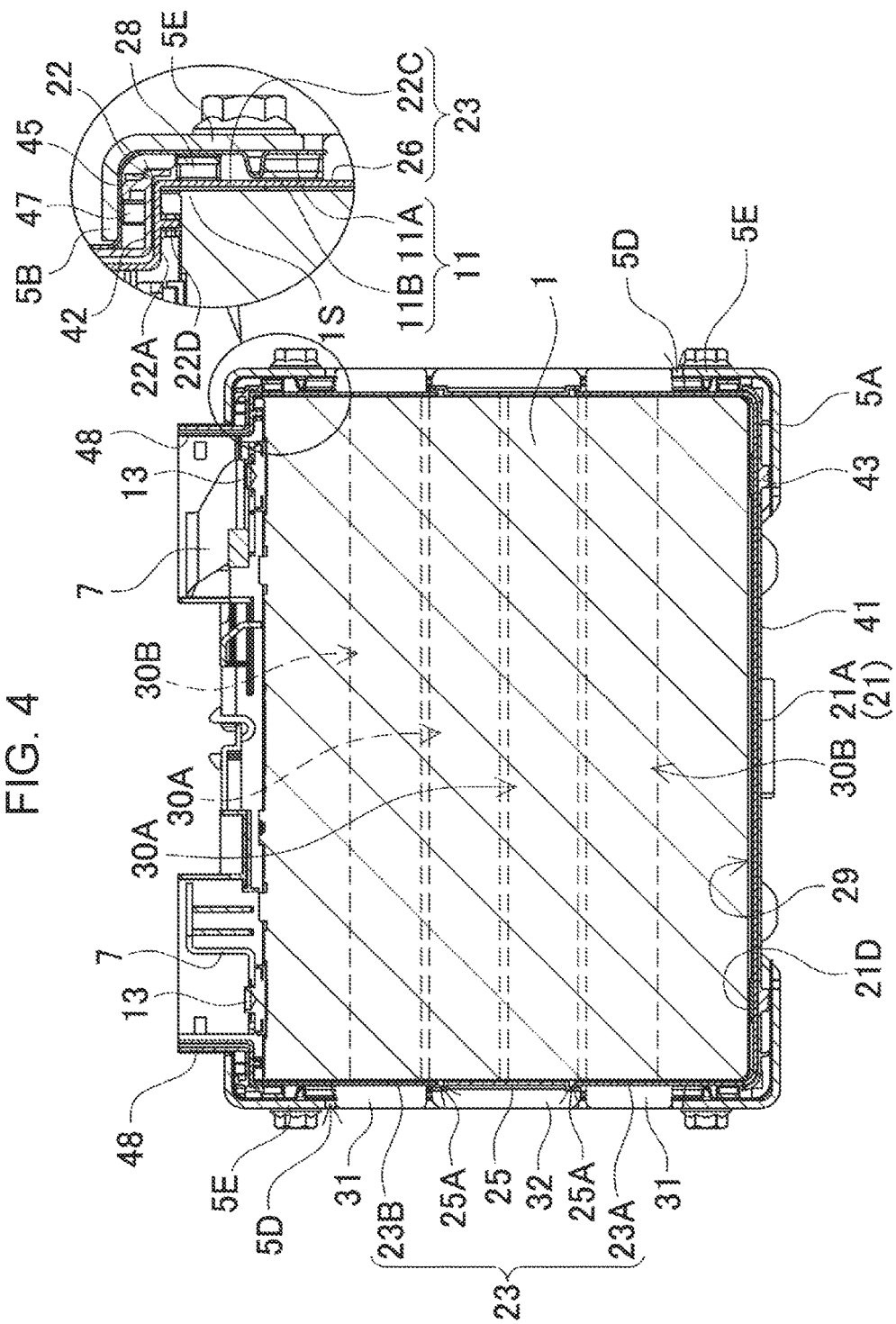
FIG. 4 is a sectional view of the power supply device illustrated in FIG. 1 taken along line IV-IV, a portion of which is enlarged.
Figure 5:
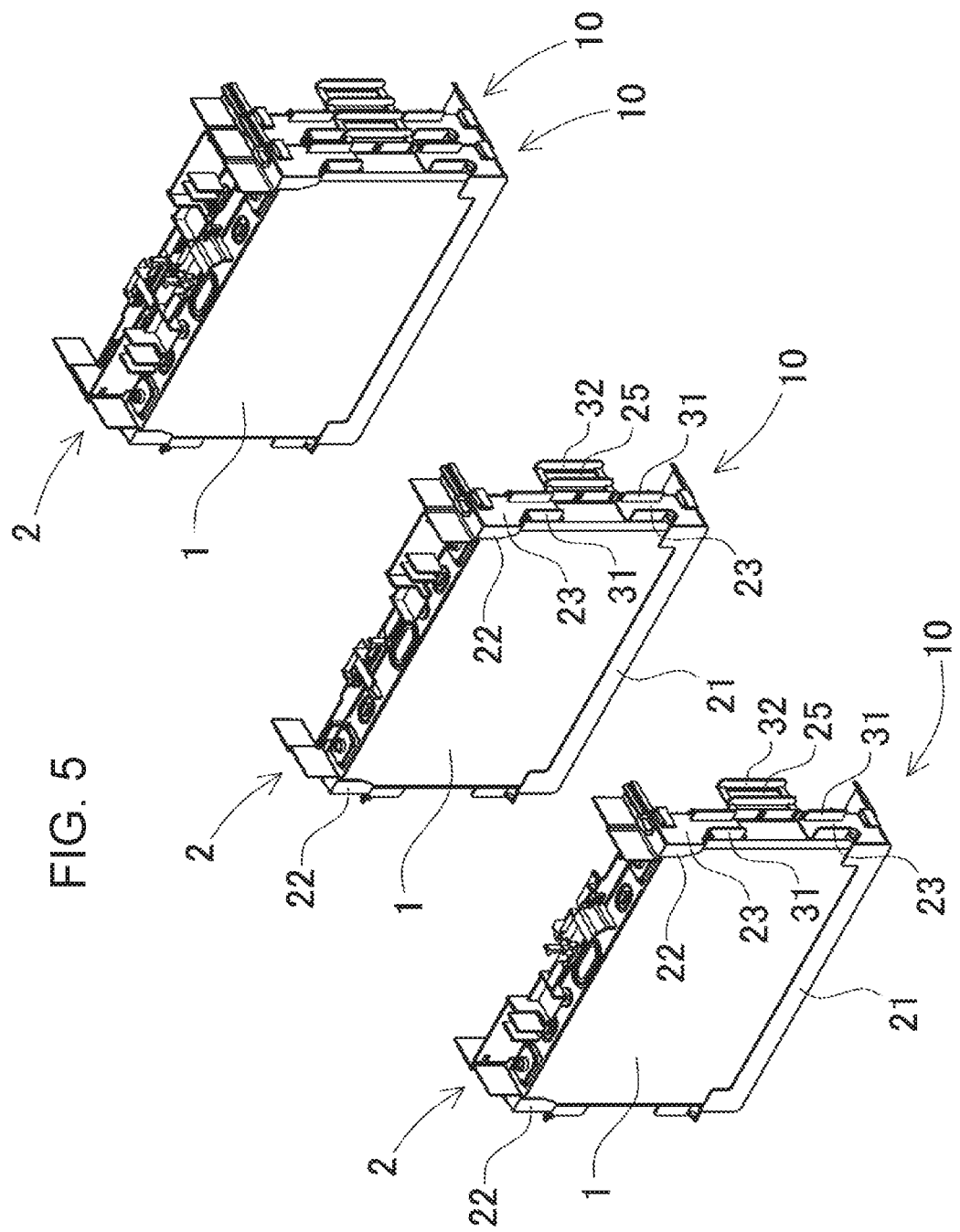
FIG. 5 is an exploded perspective view illustrating a stacked structure of a battery cell unit.
Figure 8:
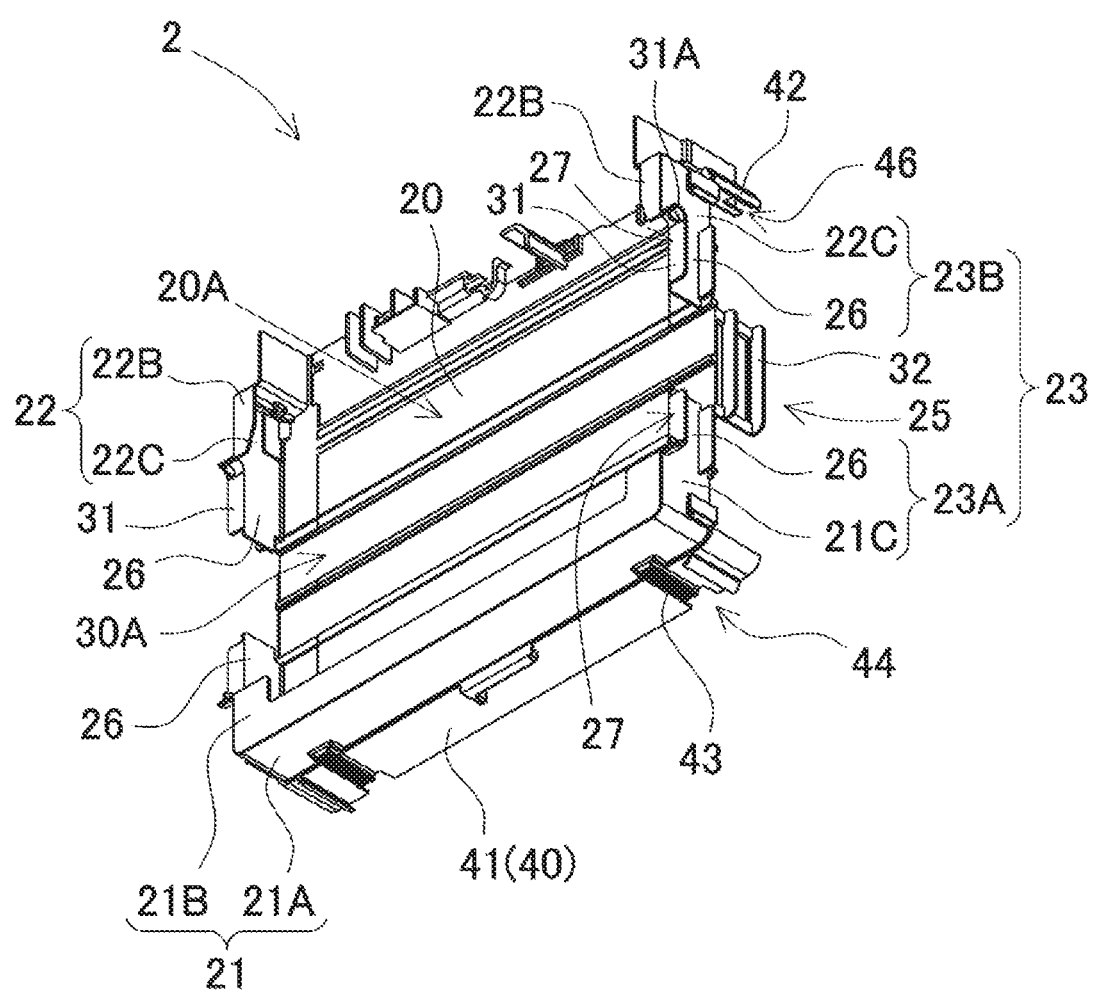
FIG. 8 is a bottom perspective view of the separator illustrated in FIG. 6.

Furthermore, corner covering section 22 illustrated in FIGS. 4 and 8 has positioning projection 22D projecting on the inner surface of top surface covering part 22A. Separator 2 is configured to be capable of disposing battery cell 1 on a fixed position of separator 2 by bringing positioning projections 22D to be in contact with both sides of the top surface of battery cell 1.

(Side Wall 23)

Separator 2 also has side wall 23 that defines the side surfaces of box-shaped covering section 21 and corner covering section 22 on the side surface of main plate section 20 on the side of first surface 20A. Side wall 23 illustrated in FIGS. 5 to 9 has lower side wall 23A including the side surface of box-shaped covering section 21 and upper side wall 23B including the side surface of corner covering section 22. Illustrated side wall 23 has cutout 24 at the intermediate portion thereof, and is vertically divided into lower side wall 23A and upper side wall 23B by cutout 24. Lower side wall 23A has side surface covering part 21C of box-shaped covering section 21 and longitudinal side wall 26 extending upward from side surface covering part 21C, and covers the bottom part of side surface 1Y of facing battery cell 1 by side surface covering part 21C and longitudinal side wall 26. Upper side wall 23B has side surface covering part 22C of corner covering section 22 and longitudinal side wall 26 extending downward from side surface covering part 22C, and covers the top part of side surface 1Y of facing battery cell 1 by side surface covering part 22C and longitudinal side wall 26. In a state where separator 2 is attached to battery cell 1, the central part of side surface 1Y of battery cell 1 is exposed to the outside without being covered by side wall 23 as illustrated in FIG. 5.

Longitudinal side walls 26 of lower side wall 23A and upper side wall 23B are formed such that one of side edges is connected to main plate section 20 and the other is located anterior to second main surface 1Xb of battery cell 1, with the horizontal width thereof being smaller than the thickness of battery cell 1. Specifically, illustrated lower side wall 23A and upper side wall 23B are each formed such that the horizontal width of longitudinal side wall 26 is set smaller than the horizontal width of side surface covering parts 21C, 22C to form an exposure cut portion 27 on the side edge of longitudinal side wall 26 on a side of second main surface 1Xb, and a corner portion of external case 1a of battery cell 1 is exposed on this portion. At exposure cut portions 27 of longitudinal side walls 26, openings on both ends of air passage 8 formed between battery cell 1 and main plate section 20 of separator 2 are disposed, the detail of which will be described later. In other words, side walls 23 ensure an air blowing path for air passage 8 by allowing the corner portion of external case 1a to be exposed along exposure cut portions 27 of longitudinal side walls 26.

Figure 10:
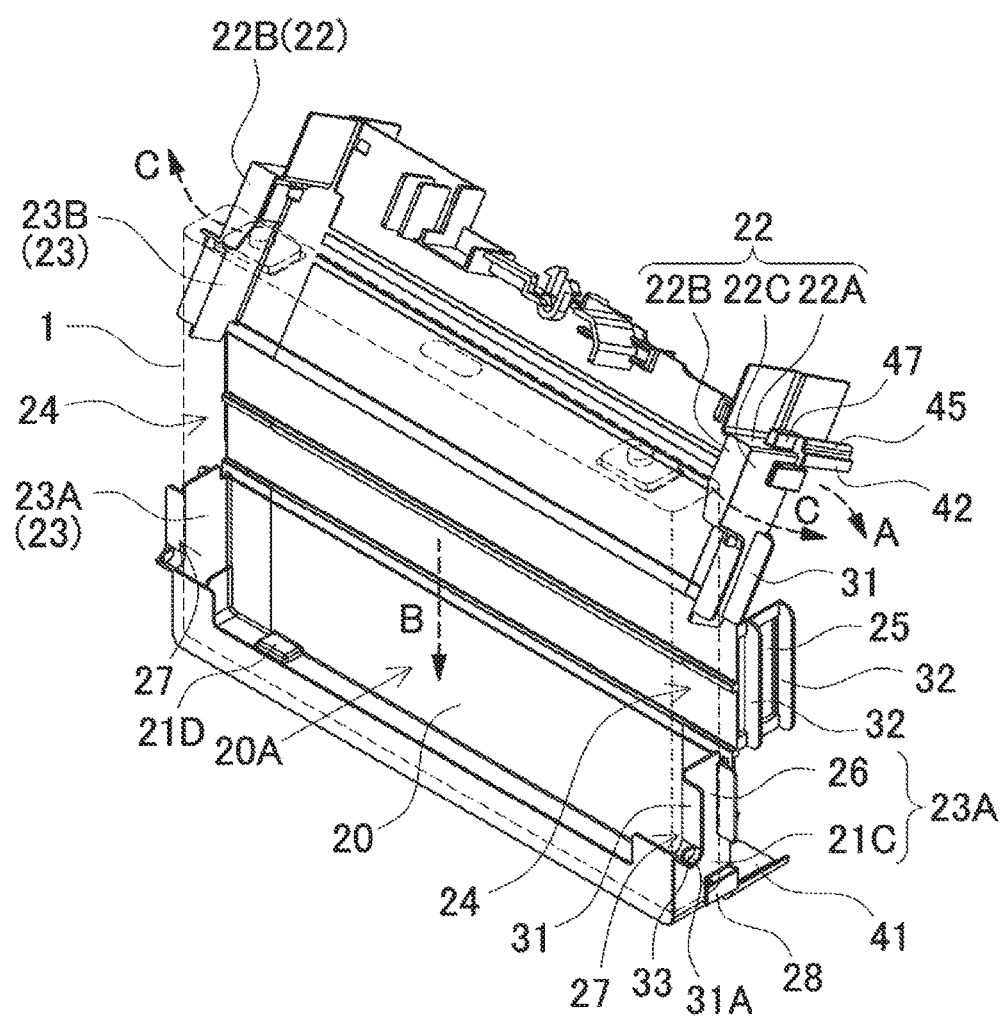
FIG. 10 is a perspective view illustrating a state of inserting the battery cell into the separator.

Separator 2 has side walls 23 on side surfaces of main plate section 20 on the side of first surface 20A, whereby side surfaces 1Y of battery cell 1 to which separator 2 is attached are covered by side walls 23 to be insulated, and further, separator 2 has cutout 24 on the intermediate part of side walls 23, which enables main plate section 20 to be easily deformed at a portion where cutout 24 is formed, whereby separator 2 is easily attached to battery cell 1. As illustrated in FIG. 10, the upper part of main plate section 20 of separator 2 is bent toward second surface 20B (see arrow A) at cutout 24 of side walls 23, whereby insertion (see arrow B) of bottom surface 1T of battery cell 1 into box-shaped covering section 21 can be facilitated. Further, corner 1S of battery cell 1 is guided to the inside of corner covering section 22 with the bent upper part of main plate section 20 being returned to the original state, whereby battery cell 1 can be set at a fixed position of separator 2. Particularly, when corner 1S of battery cell 1 is guided to corner covering section 22, front surface covering part 22B which is elastically deformed is externally turned up (see arrow C) to widen the opening of the recess, whereby insertion of corner 1S of battery cell 1 can be facilitated.

Illustrated side wall 23 also has projections 28 projecting outside on the surfaces of side surface covering parts 21C and 22C. These projections 28 have planar tip surfaces, and enable positioning as being in contact with the inner surface of bind bar 5 disposed on the side surface of battery stack 9. Separator 2 can keep a predetermined space between separator 2 and bind bar 5 by bringing the tip surfaces of projections 28 into contact with the inner surface of bind bar 5.

(Oppositely Extending Side Wall 25)

Separator 2 also has oppositely extending side walls 25 which extend toward second surface 20B of main plate section 20 along cutout 24 of side walls 23. Oppositely extending side wall 25 has a plate shape protruding toward second surface 20B of main plate section 20, and is formed into a shape engageable with cutout 24 of adjacently disposed separator 2 as illustrated in FIG. 5. In addition, oppositely extending side wall 25 illustrated in FIGS. 7 and 9 has stepped recesses 25A formed along both upper and lower ends on the surface facing side surface 1Y of battery cell 1 such that the leading ends of longitudinal side walls 26 of facing separator 2 are guided to and engaged with stepped recesses 25A. Oppositely extending side wall 25 has an overlap structure where the leading end of longitudinal side wall 26 and stepped recess 25A overlap each other, thereby effectively preventing condensed water droplets or the like from passing through this portion. In addition, the inner surface of side wall 23 and inner surface of oppositely extending side wall 25 can be disposed along side surface 1Y of battery cell 1 as being located on the same plane.

As described above, separators 2 which face each other and are provided with oppositely extending side walls 25 can be engaged with each other by oppositely extending side walls 25 and cutouts 24 to be mechanically connected to each other in a state where battery cell units 10 adjacent to each other are stacked. Accordingly, in a process for stacking battery cell units 10, battery cell units 10 can quickly be stacked in the right position without being stacked in a wrong direction. In addition, an exposed portion of battery cell 1 generated at cutout 24 of separator 2 is covered by oppositely extending side walls 25 of separator 2 of adjacent battery cell unit 10, whereby side surface 1Y of battery cell 1 can be almost entirely covered. Accordingly, both side surfaces of battery stack 9 are almost entirely covered by side walls 23 and oppositely extending side walls 25 of separators 2 to prevent the surfaces of external cases 1a having a potential from being exposed to the outside, whereby safety can be improved.

(Air Passage 8)

Separator 2 which is in close contact with the surface of battery cell 1 is also formed with a groove-shaped recess on the surface of main plate section 20 to form air passage 8 between separator 2 and the surface of the battery cell facing separator 2 in order to blow a cooling gas along the surface of battery cell 1. Separator 2 illustrated in FIGS. 3 to 5, 7, and 8 has air blowing channel 30 extending to both side ends on the surface facing battery cell 1, and a gap generated between air blowing channel 30 and main surface 1X of battery cell 1 is defined as air passage 8. As illustrated in FIGS. 1 and 6 to 9, air passage 8 is horizontally formed to be open at left and right side surfaces of battery stack 9.

Separator 2 illustrated in FIGS. 3, 6 to 9, and 11 is provided with multiple rows of air blowing channels 30 on both surfaces of main plate section 20 to form air passages 8 on both surfaces of main plate section 20. Air passages 8 formed on both surfaces of main plate section 20 are linear, and formed such that multiple rows are parallel to one another. This structure provides an effect of capable of efficiently cooling battery cells 1 disposed to respectively face both surfaces of main plate section 20 by means of air passages 8 formed on both surfaces of main plate section 20. It is to be noted that the separator may be configured to have an air blowing channel on only one surface to form an air passage between the battery cell and the main plate section. This separator can be configured to have an air passage on only a central part facing the central part of the battery cell, for example.

Figure 11:
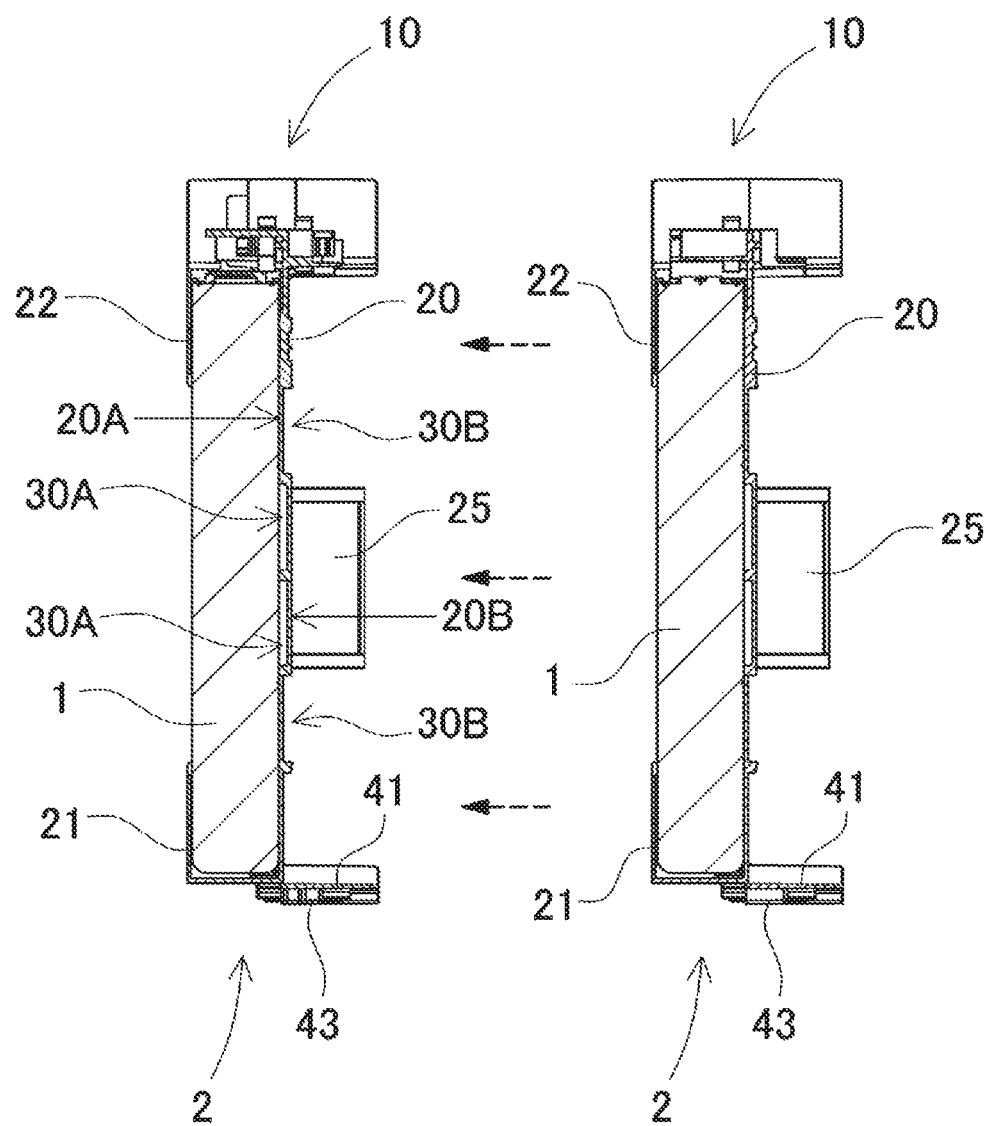
FIG. 11 is an exploded sectional view illustrating a state where the battery cell units illustrated in FIG. 5 are stacked.

Separator 2 illustrated in FIGS. 6, 8, and 11 has first air blowing channel 30A formed on first surface 20A of main plate section 20, and due to this first air blowing channel 30A, air passage 8 is formed between battery cell 1 stacked on the side of first surface 20A of main plate section 20 and main plate section 20. Illustrated separator 2 has two rows of first air blowing channels 30A on the central part of first surface 20A of main plate section 20, and openings of first air blowing channels 30A at both ends communicate with cutout 24. In this structure, air passage 8 for cooling battery cell 1 stacked on the side of first surface 20A of main plate section 20 is formed so as to communicate with cutout 24 on side walls 23, whereby a path of a cooling gas can be ensured on left and right side surfaces of battery stack 9. In addition, the amount of protrusion, toward second surface 20B, of oppositely extending side walls 25 disposed to be engaged with cutout 24 is adjusted so as not to close the openings of first air blowing channels 30A at both ends.

Figure 9:
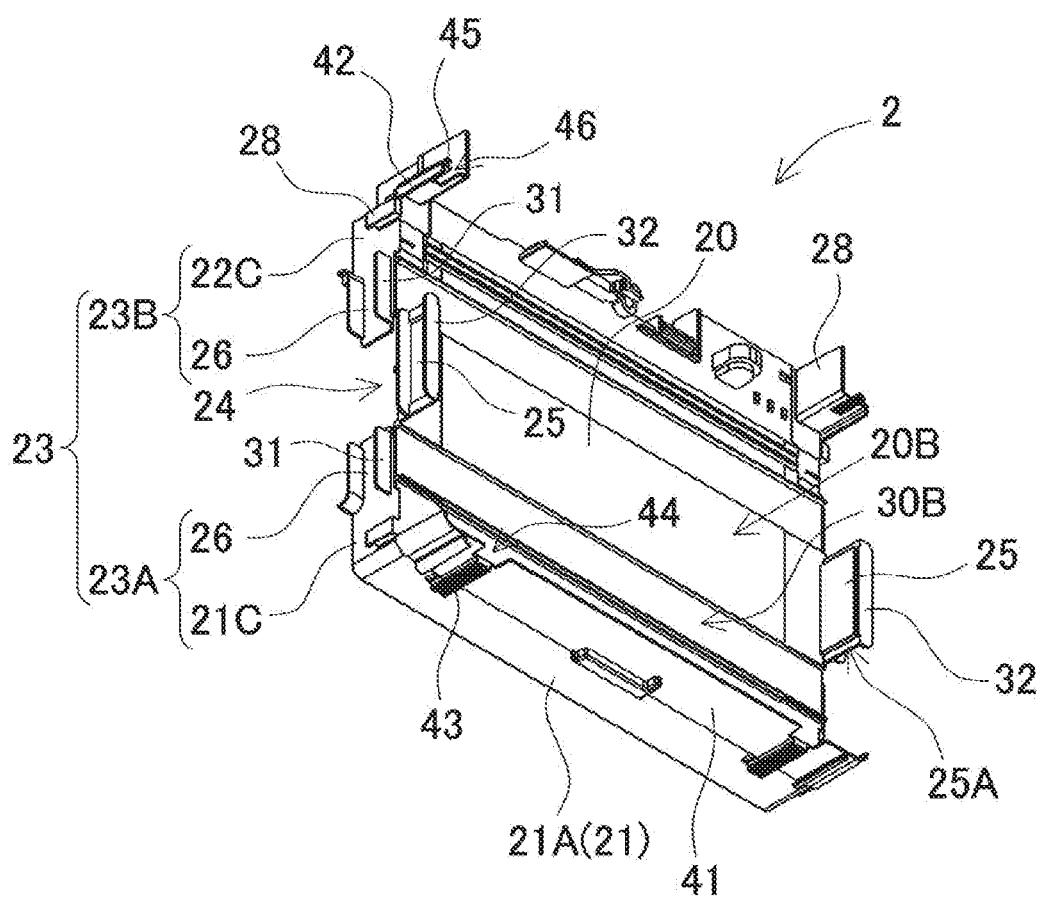
FIG. 9 is a bottom perspective view of the separator illustrated in FIG. 7.

Separator 2 illustrated in FIGS. 7, 9, and 11 has second air blowing channel 30B formed on second surface 20B of main plate section 20, and due to this second air blowing channel 30B, air passage 8 is formed between battery cell 1 stacked on the side of second surface 20B of main plate section 20 and main plate section 20. Illustrated separator 2 has one row of second air blowing channel 30B at each of upper and lower parts of second surface 20B of main plate section 20. Separator 2 has second air blowing channels 30B formed on the back of first air blowing channels 30A formed on first surface 20A along upper and lower ends of projecting strip projecting toward second surface 20B, in which the openings of second air blowing channels 30B on both ends are open along side walls 23. In addition, in illustrated separator 2, the openings of second air blowing channels 30B on both ends are disposed along exposure cut portions 27 formed on side walls 23 of separator 2 which is stacked to face this separator 2. Thus, the openings of second air blowing channels 30B on both ends are exposed to the outside to ensure a path for a cooling gas on left and right side surfaces of battery stack 9.

To blow a cooling gas, air passages 8 formed on both surfaces of main plate section 20 are disposed to face air blowing openings 5D formed on bind bars 5 which are disposed on the side surfaces of battery stack 9 as illustrated in FIG. 4. The cooling gas forcibly blown to battery cells 1 flows in air passages 8 through air blowing openings 5D formed on one of bind bars 5 to cool the battery cells, passes through air passages 8, and then, flows outside from air blowing openings 5D formed on other bind bar 5.

(Vertical Walls 31 and 32)

Separator 2 also has vertical walls 31 and 32 along the longitudinal direction of side wall 23 and oppositely extending side wall 25 disposed on side surface 1Y of battery cell 1. Side wall 23 illustrated in FIGS. 5 to 9 is provided with two rows of vertical walls 31 protruding outside along both side edges of longitudinal side wall 26 extending from side surface covering parts 21C and 22C. Two rows of vertical walls 31 on side wall 23 are parallel to each other. Vertical wall 31, which is formed along exposure cut portion 27, of two rows of vertical walls 31 is provided with curved part 31A along a boundary with each of side surface covering parts 21C and 22C, whereby the creepage distance between the inner surface and the outer surface of side wall 23 is increased throughout the entire region of exposure cut portion 27. Illustrated curved part 31A is reinforced by rib 33 provided parallel to side wall 23 along the inner surface. In addition, vertical wall 31 formed along exposure cut portion 27 of side wall 23 is provided to erect along the openings on both ends of second air blowing channel 30B formed on second main surface 20B of main plate section 20 facing battery cell 1, and this structure enables a cooling gas blown from the outside to efficiently flow into air passage 8 along vertical wall 31.

In addition, oppositely extending side wall 25 illustrated in FIGS. 5 to 9 is provided with two rows of vertical walls 32 which are parallel to each other along the longitudinal direction. As illustrated in FIG. 5, two rows of vertical walls 32 on oppositely extending side wall 25 are formed to be located on an extended line of two rows of vertical walls 32 formed on side wall 23, in a state where battery cells units 10 adjacent to each other are stacked with oppositely extending side wall 25 of one of battery cell unit 10 being engaged with cutout 24 of other battery cell unit 10. Vertical walls 32 formed along the leading end of oppositely extending side wall 25 are provided to erect along the openings on both ends of first air blowing channel 30A, and this structure enables a cooling gas blowing from the outside to efficiently flow in air passage 8 along vertical walls 32.

Figure 12:
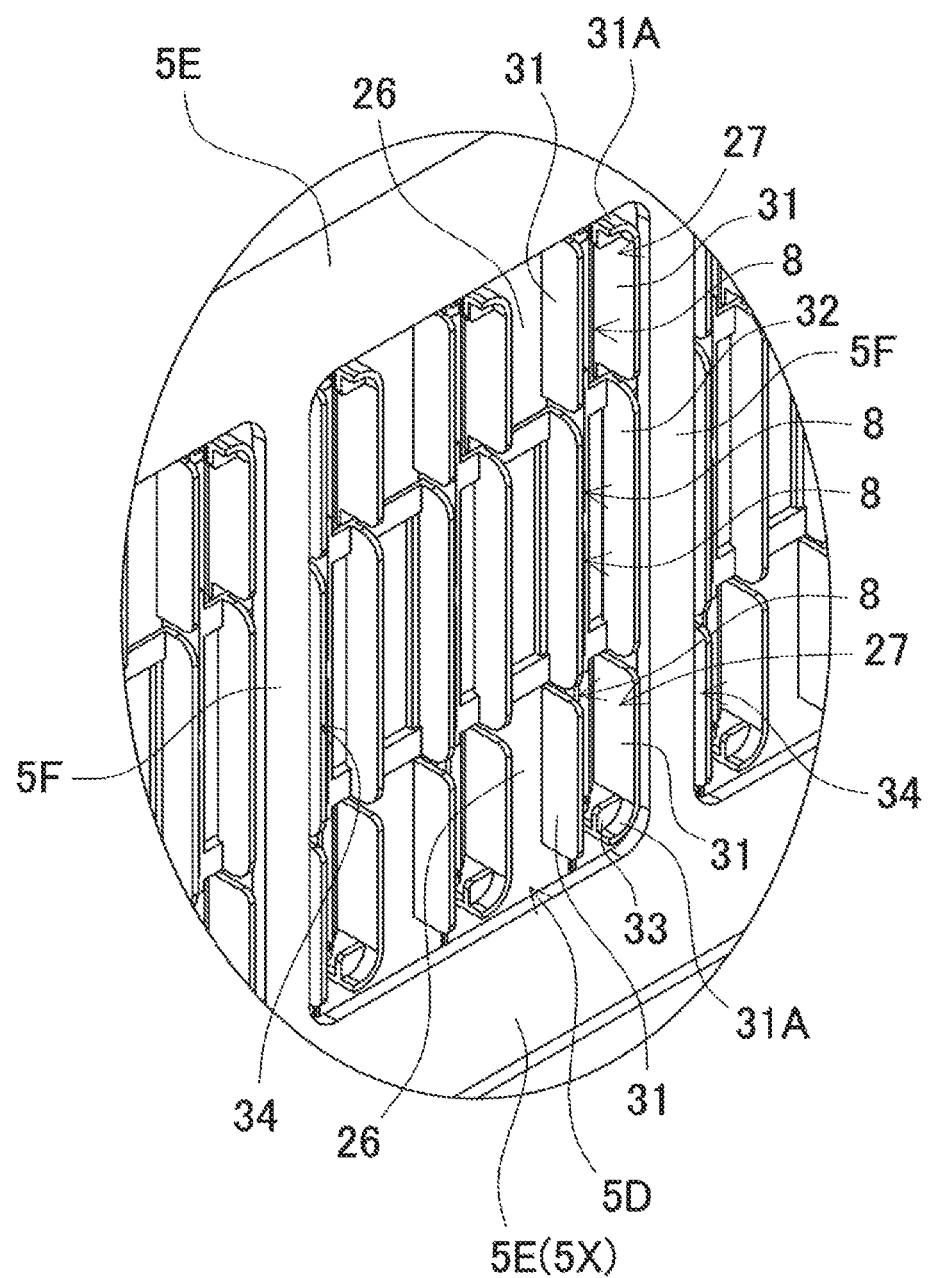
FIG. 12 is an enlarged perspective view illustrating a side surface of the power supply device illustrated in FIG. 1.

Vertical walls 31 and 32 formed on side wall 23 and oppositely extending side wall 25 are disposed in air blowing opening 5D formed on side surface plate section 5X of bind bar 5 which is disposed on the side surface of battery stack 9 as illustrated in FIG. 12. Thus, the creepage distance between battery cells 1 and bind bar 5 can be increased to prevent a short circuit between battery cells 1 and bind bar 5 due to dew condensation or the like. An amount of protrusion of illustrated vertical walls 31 and 32 are adjusted such that the leading ends of vertical walls 31 and 32 are almost on the same plane as the outer surface of bind bar 5. It is to be noted that the vertical walls may be formed such that the leading ends thereof protrude from the outer surface of the bind bar. Furthermore, the structure in which vertical walls 31 and 32 are disposed in air blowing opening 5D of bind bar 5 enables a cooling gas to smoothly flow in air passages 8 which are formed along vertical walls 31 and 32.

In addition, side wall 23 and oppositely extending side wall 25 illustrated in FIG. 12 define continuous longitudinal channel 34 by two rows of vertical walls 31 and two rows of vertical walls 32 which face each other. In the illustrated power supply device, bind bar 5 disposed on the side surface of battery stack 9 is provided with connection bars 5F in air blowing opening 5D, and connection bar 5F is inserted into longitudinal channel 34. This structure in which connection bar 5F of bind bar 5 is inserted into longitudinal channel 34 formed by vertical walls 31 and 32 formed on side wall 23 and oppositely extending side wall 25 can effectively prevent a short circuit between battery cell 1 and connection bar 5F due to dew condensation or the like.

(Positioning Connection Section 40)

Illustrated separator 2 is also provided with positioning connection section 40 protruding in the stacking direction of battery cells 1 along the outer perimeter of main plate section 20 such that battery cell units 10 stacked adjacent to each other can be connected at fixed positions. Illustrated positioning connection section 40 has bottom surface connecting section 41 for positioning both corners of the bottom surface of separator 2 and corner connecting section 42 for positioning both corners of the top surface of separator 2.

(Bottom Surface Connecting Section 41)

Bottom surface connecting section 41 is formed to protrude toward second surface 20B along the lower end of main plate section 20. Bottom surface connecting section 41 has a plate shape extending in the stacking direction of battery cells 1, and is formed on the entire bottom surface of box-shaped covering section 21. Bottom surface connecting section 41 is placed on the bottom surface of box-shaped covering section 21 of adjacently stacked battery cell unit 10, and connected to the outside of box-shaped covering section 21 of facing separator 2. Illustrated bottom surface connecting section 41 has both sides rising along both corners of box-shaped covering section 21, and is connected to box-shaped covering section 21, while positioning left and right sides of box-shaped covering section 21 with the rising portions.

As described above, the bottom surface part of box-shaped covering section 21 is formed to have a double wall structure with bottom surface connecting section 41. Therefore, even if box-shaped covering section 21 or bottom surface connecting section 41 is broken due to, for example, degradation over time or vibration, electrical conduction to bind bar 5 due to condensed water or the like can effectively be prevented. Notably, from the viewpoint of connecting the adjacent separators as being positioned with respect to each other, the bottom surface connecting section does not necessarily cover the entire bottom surface, and can be configured to cover only both sides of the bottom surface. In this case, the bottom surface connecting section is preferably formed to face a portion in contact with lower-end bent section of the bind bar.

In addition, bottom surface connecting section 41 illustrated in FIGS. 3 to 7 is provided with projecting strips 43 which position lower-end bent section 5A of bind bar 5 as being in contact therewith. Illustrated bottom surface connecting section 41 is provided with projecting strips 43 extending in the stacking direction of battery cells 1 on the portion facing lower-end bent section 5A of bind bar 5. When separators 2 are stacked and connected to one another, projecting strips 43 on separators 2 adjacent to each other are linearly connected to form a row of connection projecting strip extending in the direction in which lower-end bent section 5A of bind bar 5 extends. In a state where bind bar 5 is disposed on the side surface of battery stack 9, projecting strip 43 can position lower-end bent section 5A such that the inner surface of lower-end bent section 5A is brought into contact with the end surface of projecting strip 43. In addition, bottom surface connecting section 41 illustrated in FIGS. 8 and 9 is provided with cutouts 44 on an end facing projecting strips 43, thereby being capable of positioning facing separator 2 in such a way that projecting strips 43 on facing separator 2 are inserted into cutouts 44. Projecting strips 43 illustrated in FIGS. 8 and 9 are formed to extend from bottom surface connecting section 41 to a portion of box-shaped covering section 21, and are connected to cutouts 44 on bottom surface connecting section 41 on the bottom surface of box-shaped covering section 21 with an engagement structure.

(Corner Connecting Section 42)

Corner connecting sections 42 are formed to protrude toward second surface 20B along both corners of the top surface of main plate section 20. Each of corner connecting sections 42 has a plate shape with substantially an L-shaped vertical section, and extends in the stacking direction of battery cells 1. Corner connecting section 42 is overlaid to be connected to the outer side of corner covering section 22 along the upper ends of top surface covering part 22A and side surface covering part 22C of corner covering section 22. Corner connecting section 42 having substantially an L-shaped vertical section and connected to corner covering section 22 achieves positioning in the vertical direction by a horizontal part and achieves positioning in the horizontal direction by a vertical part.

Corner connecting section 42 illustrated in FIGS. 8 and 9 has, on the tip of the horizontal part, engagement cutout 46 with which engagement projection 47 formed on the surface of top surface covering part 22A of facing separator 2 is engaged, whereby separators 2 can be positioned with respect to each other.

In addition, corner connecting section 42 illustrated in FIGS. 3 to 7 is provided with projecting strip 45 which positions upper-end bent section 5B of bind bar 5 as being in contact therewith. Illustrated corner connecting section 42 is provided with projecting strip 45 extending in the stacking direction of battery cells 1 on an upper surface of the horizontal part which faces upper-end bent section 5B of bind bar 5. In a state where separators 2 are stacked and connected to one another, projecting strips 45 on separators 2 adjacent to each other are linearly connected to form a row of connection projecting strip extending in the direction in which upper-end bent section 5B of bind bar 5 extends. Separators 2 can be positioned such that, in a state where bind bar 5 is disposed on the side surface of battery stack 9, the inner surface of upper-end bent section 5B of bind bar 5 is brought into contact with the end surface of projecting strips 45.

Separator 2 illustrated in FIGS. 4 to 9 is also provided with rising wall 48, which protrudes upward along the side edges of corner covering section 22 and corner connecting section 42, on both sides of the top surface. Rising wall 48 separates electrode terminal 13 on the top surface of battery cell 1 from the leading end of upper-end bent section 5B of bind bar 5 for insulating them from each other. The structure in which rising wall 48 is formed between the leading end of bind bar 5 and the top surface of battery cell 1 increases the creepage distance on this portion, thereby being capable of effectively preventing an unexpected short circuit.

In a state where battery cell units 10 which are adjacent to each other are stacked and connected to each other, positioning connection section 40 described above connect adjacently stacked separators 2 to each other, while performing vertical and horizontal positioning, such that bottom surface connecting section 41 is connected along the bottom surface of box-shaped covering section 21 and corner connecting section 42 is connected along the outer perimeter of corner covering section 22, as illustrated in FIG. 11. In addition, bottom surface connecting section 41 connected along the bottom surface of box-shaped covering section 21 is positioned such that projecting strips 43 on facing separator 2 are engaged with cutouts 44 formed on the leading end of bottom surface connecting section 41. Also, corner connecting section 42 connected along the outer perimeter of corner covering section 22 is positioned such that engagement projection 47 on facing separator 2 is engaged with engagement cutout 46 formed on the leading end of the horizontal part.

(Battery Cell Unit 10)

Separator 2 described above is attached to battery cell 1 to construct battery cell unit 10 as illustrated in FIG. 5. Battery cell unit 10 has a structure in which the surface of battery cell 1 is partially covered by separator 2, and when battery cell units 10 are stacked to construct battery stack 9, the almost entire region of the top surface of battery cell 1 except for a portion, for example, the portion corresponding to electrode terminals 13, can be covered. This structure can reliably prevent direct contact of a person or a metal with the surface of battery cell 1 having a potential, thereby being capable of preventing unexpected current flow. In addition, due to the almost entire surface of battery cell 1 being covered, current flow on the surface of battery cell 1 caused by contact with an external member, such as bind bar 5, can effectively be prevented, even if condensed water is generated.

In addition, due to battery cell unit 10 being constructed by battery cell 1 and separator 2, an operation can be performed on battery cell unit 10 basis during a manufacturing process, whereby a benefit to improve workability can also be provided. For example, in a conventional power supply device, battery cells and separators interposed between the battery cells are alternately stacked to form a battery stack, and the obtained battery stack is fastened as being pressed from both ends. Therefore, it is necessary to stack the battery cell and the separator on each other, which requires much labor and time. On the other hand, according to the present invention, separator 2 is attached to battery cell 1 to form battery cell unit 10, and battery cell units 10 are stacked to construct battery stack 9, whereby an operation can be simplified and productivity can be improved. In addition, operations such as storage, conveyance, and assembly can be performed with separator 2 being attached to battery cell 1, whereby safety can be improved.

Other Exemplary Embodiments

Figure 13:
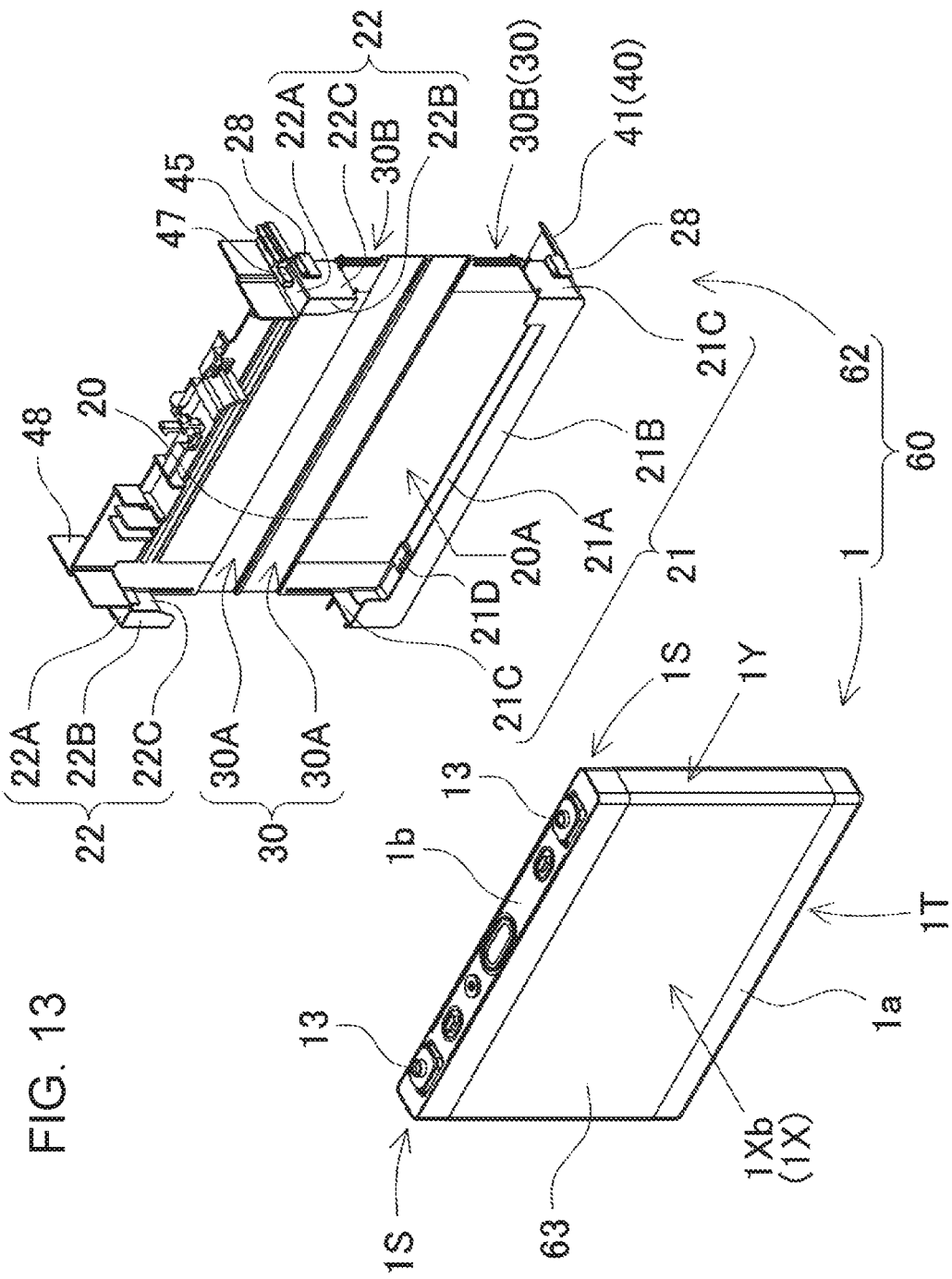
FIG. 13 is an exploded perspective view illustrating another example of the power supply unit.

In addition, the separator can be configured as illustrated in FIG. 13. Separator 62 according to an exemplary embodiment illustrated in FIG. 13 is obtained by eliminating side walls 23 covering side surfaces 1Y of battery cell 1 and oppositely extending side walls 25 from separator 2 illustrated in FIG. 6. Specifically, separator 62 can be configured to have the same structure as separator 2 illustrated in FIG. 6 regarding configuration elements except for side walls 23 and oppositely extending side walls 25. Therefore, the configuration elements in FIG. 13 same as those in FIG. 6 are identified by the same reference marks, and the detailed description thereof is omitted.

Separator 62 illustrated in FIG. 13 is provided with: box-shaped covering section 21 that is provided on a bottom part of main plate section 20 on a side of first surface 20A covering main surface 1X of battery cell 1 disposed to face separator 62 and that receives and covers bottom surface 1T of battery cell 1; and corner covering section 22 that is provided on a top part of main plate section 20 on the side of first surface 20A for covering corner 1S of a top surface of battery cell 1. This separator 62 is configured such that the side surface of battery cell 1 is exposed without providing the side wall and oppositely extending side wall on a portion corresponding to the intermediate part of side surface 1Y of battery cell 1. In illustrated separator 62, both side edges of main plate section 20 are cut.

This separator 62 has a feature of enabling mass production at low cost by simplifying a mold for manufacturing separator 62, because of main plate section 20 not being provided with the side wall and oppositely extending side wall on the side surface thereof. In addition, separator 62 without having a side wall enables main plate section 20 to be freely deformed at the intermediate part, and is thereby capable of being simply and easily set on battery cell 1. Like separator 2 illustrated in FIG. 10, separator 62 can facilitate insertion of bottom surface 1T of battery cell 1 into the inside of box-shaped covering section 21 by curving or bending the upper part of main plate section 20 toward the opposite side of first surface 20A, and enables battery cell 1 to be set on a fixed position of separator 62 by guiding corner 1S of battery cell 1 to the inside of corner covering section 22 while returning the curved or bent upper part of main plate section 20 to the original state.

In addition, main plate section 20 illustrated in FIG. 13 is formed with air blowing channel 30 for forming an air passage between main plate section 20 and the surface of the battery cell facing main plate section 20. Separator 62 illustrated in FIG. 13 is formed with two rows of first air blowing channels 30A on the central part of first surface 20A of main plate section 20, and a row of second air blowing channel 30B on vertically each side of first air blowing channels 30A on the opposite surface. Notably, this separator can be configured such that the main plate section is formed to have a concavo-convex shape in a cross section to form the first air blowing channels and the second air blowing channels on both surfaces in an alternating manner.

Figure 14:
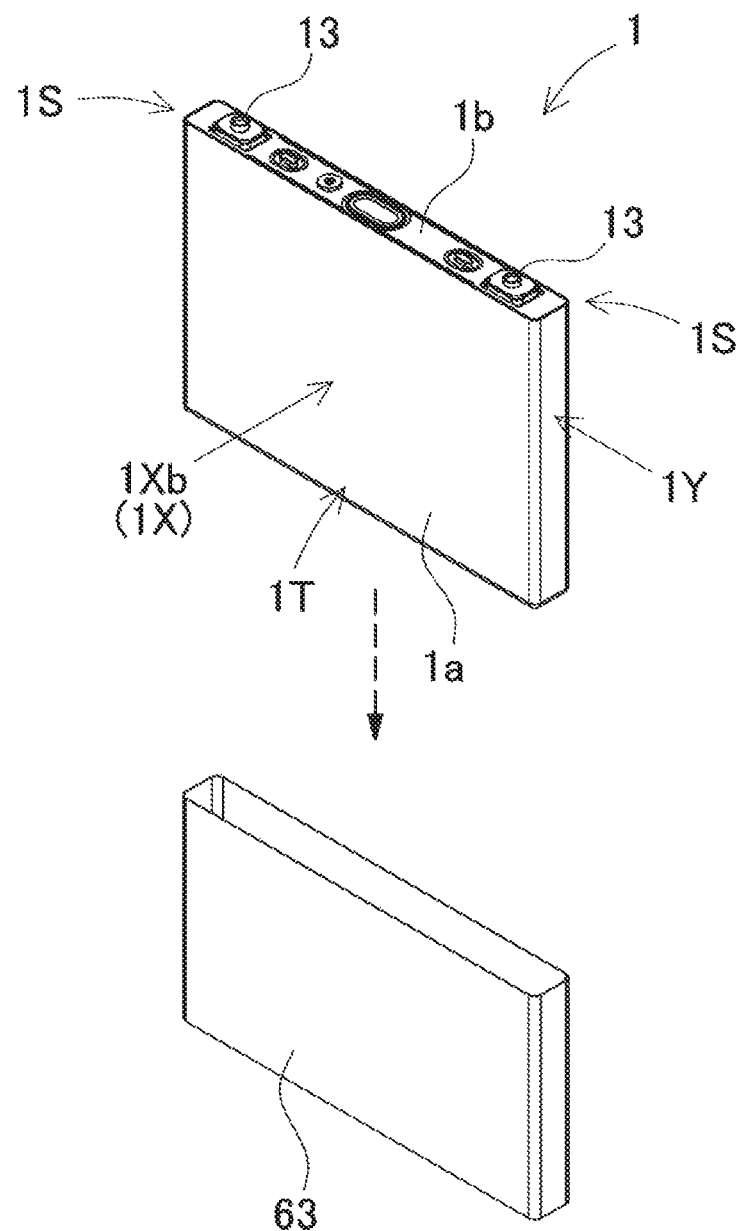
FIG. 14 is a perspective view of the battery cell illustrated in FIG. 13 and a cover film.

While separator 62 illustrated in FIG. 13 has an open side surface, the exposure of the outer perimeter of battery cell 1, which is to be set on separator 62, to the outside from the side surface of separator 62 is prevented by covering the outer perimeter of battery cell 1 by insulating cover film 63. Battery cell 1 illustrated in FIG. 13 has cover film 63 attached on an intermediate part of prismatic external case 1a in the vertical direction. This cover film 63 is a silicon film, for example, and is formed into a tubular shape following the outer perimeter of external case 1a as illustrated in FIG. 14. Cover film 63 covers the surface of external case 1a of battery cell 1 as being in close contact therewith, whereby the intermediate part of the outer perimeter of battery cell 1 is covered in an insulated state.

Cover film 63 prevents external case 1a of battery cell 1 from being exposed from the side surface of separator 62 to the outside. Therefore, cover film 63 illustrated in FIG. 13 has a length for covering a portion, on side surface 1Y of battery cell 1, not covered by side surface covering part 21C of box-shaped covering section 21 and side surface covering part 22C of corner covering section 22. In other words, on battery cell 1 covered by separator 62, cover film 63 extends at least from the surface of battery cell 1 covered by box-shaped covering section 21 to the surface of battery cell 1 covered by corner covering section 22. Due to cover film 63 being attached to battery cell 1, the portion exposed from the surface of separator 62 can reliably be insulated, while separator 62 is configured to have a simple structure and is manufactured at low cost.

The structure of covering the surface of battery cell 1 by cover film 63 causes an increase in production cost, in comparison to a structure of not covering the surface of battery cell 1 by a film or the like. However, illustrated cover film 63 does not cover almost the entire external case of the battery cell including the bottom part like a conventional shrink tube, but covers only the intermediate part of external case 1a, so that cover film 63 does not need to be subjected to a complicated manufacturing process for thermally shrinking the entire film to be in close contact with the surface of the battery cell, as in a conventional shrink tube. Therefore, the process for covering battery cell 1 by a film can be simplified, and the bottom surface of battery cell 1 is covered by separator 62 to be reliably insulated. Cover film 63 formed into a tubular shape for covering only the intermediate part of external case 1a is not brought into close contact with battery cell 1 by heat shrinkage, but is formed into a band-shaped film which can be wound around the outer perimeter of battery cell 1 to be in close contact therewith. Specifically, this cover film 63 covers only the intermediate part of the external case without covering the battery cell bottom surface part which is difficult to be covered by a conventional shrink tube, and thus, the manufacturing process can be simplified and production cost can be reduced.

Separator 62 described above is also attached to battery cell 1 covered by cover film 63 to construct battery cell unit 60. Battery cell unit 60 is configured such that one main surface 1X of battery cell 1 is covered by main plate section 20 of separator 62, bottom surface 1T of battery cell 1 is covered by box-shaped covering section 21, and corners 1S of the top surface are covered by corner covering sections 22. In addition, the surface of battery cell 1 not covered by separator 62, that is, other main surface 1X and side surface 1Y of battery cell 1, is covered by cover film 63. Therefore, battery cell unit 60 is covered in an insulated state on almost the entire surface of battery cell 1 except for the top surface, whereby safety for operations such as storage, conveyance, and assembly can be improved.

Furthermore, when battery cell units are stacked to construct a battery stack, main plate section 20 is interposed between adjacent battery cells 1 to insulate them from each other, and external case 1a of battery cell 1 is covered by cover film 63 on the portion exposed from the side surface. Thus, almost the entire region except for the portions corresponding to electrode terminals 13 can be covered. This structure can reliably prevent direct contact of a person or a metal with the surface of battery cell 1 having a potential, thereby being capable of preventing unexpected current flow. In addition, due to the almost entire surface of battery cell 1 being covered by cover film 63 and separator 62, current flow on the surface of battery cell 1 caused by contact with an external member, such as bind bar 5, can effectively be prevented, even if condensed water is generated.

(Battery Stack 9)

As illustrated in FIGS. 2 to 5, battery stack 9 is constructed by stacking battery cell units 10, each of which is formed by covering the surface of battery cell 1 by separator 2, in a state where main surfaces 1X of battery cells 1 face each other. In addition, battery stack 9 illustrated in FIG. 2 has intermediate bracket 6 interposed at the intermediate part of battery stack 9. This structure in which the intermediate part of battery stack 9 is reinforced by intermediate bracket 6 provides a benefit of keeping rigidity even when the number of battery cells 1 to be stacked is increased. However, it is not always necessary to interpose the intermediate bracket at the intermediate part, and the intermediate bracket can be eliminated.

(Fastening Member 3)

Figure 2:
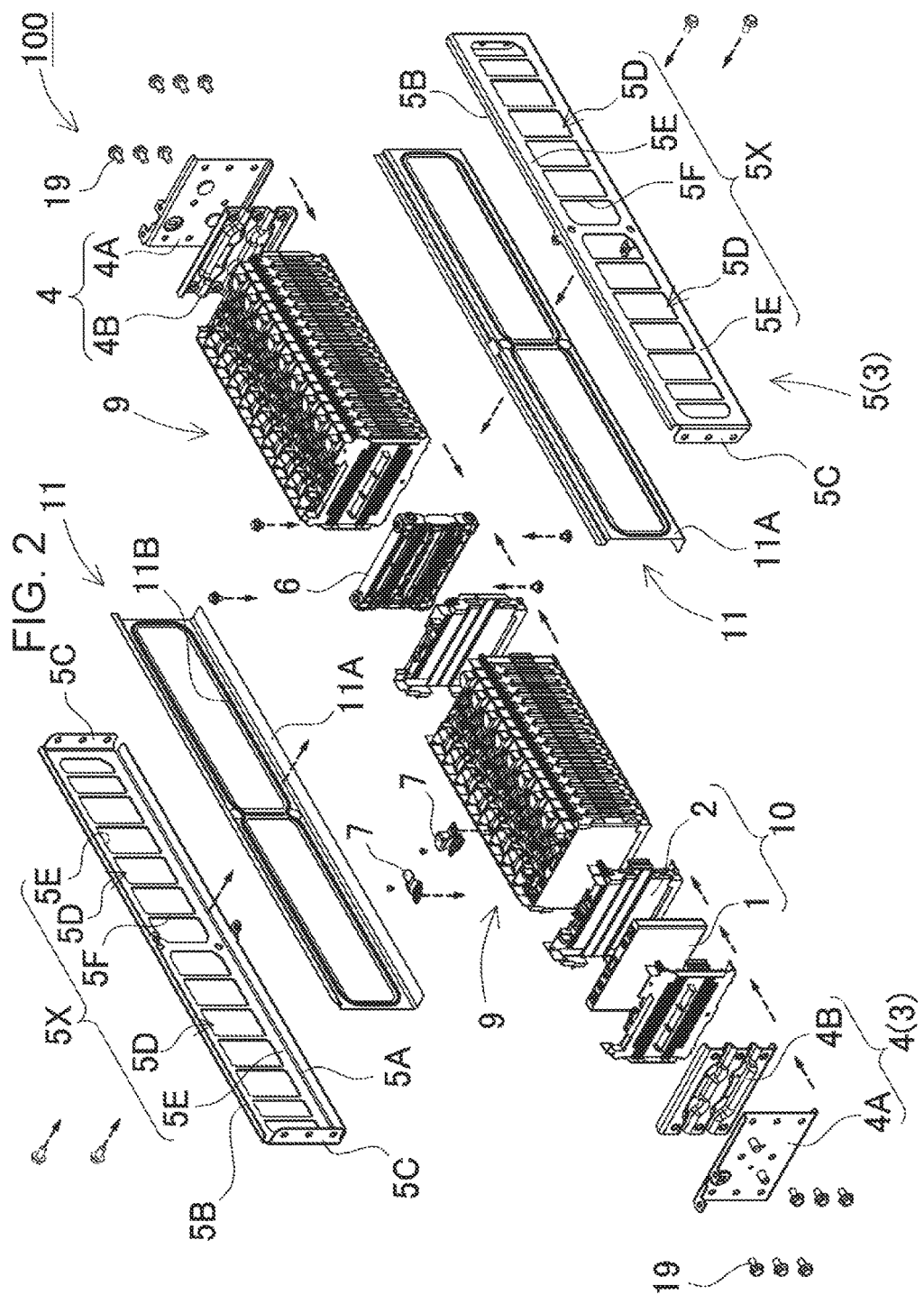
FIG. 2 is an exploded perspective view of the power supply device illustrated in FIG. 1.

As illustrated in FIGS. 1 and 2, battery stack 9 formed by stacking battery cell units 10 is fastened by fastening member 3 in the stacking direction. Fastening member 3 includes end plates 4 disposed on both end faces of battery stack 9 in the stacking direction, and bind bar 5 that fixes stacked battery cells 1 in a pressurized state with both ends being fixed to end plates 4. In battery stack 9, stacked battery cells 1 are fixed as being pressurized in a direction orthogonal to main surface 1X such that a pair of end plates 4 disposed on both end faces of battery stack 9 is connected to both ends of bind bar 5 and intermediate bracket 6 is fixed at the intermediate part of bind bar 5. It is to be noted that the fastening member is not limited to include the end plates and the bind bar. Any other structures that can fasten the battery stack in the stacking direction can be used for the fastening member.

(End Plate 3)

A pair of end plates 4 is disposed on both end faces of battery stack 9 to fasten battery stack 9. End plate 4 is formed into a rectangular plate shape which is almost equal to or slightly larger than the outer shape of battery cell 1 and which is not deformed when fixing battery stack 9 in a pressurized state. End plate 4 is made of a material exerting sufficient rigidity, such as metal. Notably, the end plate can be made of a resin material, or configured such that the resin end plate is reinforced by a metallic member. In the power supply device illustrated in FIGS. 1 to 3, end plate 4 is a laminate of two metal plates 4A and 4B. Metal end plate 4 is stacked on battery stack 9 with end separator 12 serving as an insulating material interposed therebetween.

(Bind Bar 5)

As illustrated in FIGS. 1 and 2, bind bar 5 is disposed on the side surface of battery stack 9 on which end plates 4 are stacked on both ends, and fastens battery stack 9 with both ends being fixed to a pair of end plates 4. Bind bar 5 is formed by pressing a metal plate. A metal plate made of, for example, iron, preferably a steel plate, can be used for bind bar 5. Illustrated bind bar 5 includes side surface plate section 5X disposed on the side surface of battery stack 9 and fixing sections 5C located on both ends of side surface plate section 5X and disposed on the external end faces of end plates 4. Side surface plate section 5X is formed to have an outer shape almost equal to, or to be precise, a little larger than the outer shape of the side surface of battery stack 9. Fixing section 5C is fixed on the external end face of end plate 4 through set screw 19. While bind bar 5 illustrated in FIGS. 1 to 3 is fixed to end plate 4 by means of set screw 19, it can also be connected to the end plate by inwardly bending the end of the bind bar, or by swaging the end of the bind bar.

As illustrated in FIGS. 1, 2, and 4, bind bar 5 also has upper-end bent section 5B disposed on the side edge of battery stack 9 on the top surface side, and lower-end bent section 5A disposed on the side edge of battery stack 9 on the bottom surface side. Battery stack 9 is disposed between upper-end bent section 5B and lower-end bent section 5A. In illustrated bind bar 5, the upper edge of side surface plate section 5X is bent inward at right angle to form upper-end bent section 5B, and the lower edge thereof is bent inward at right angle to form lower-end bent section 5A. Bind bar 5 has a reversed C-shape cross section intersecting the longitudinal direction by bending upper and lower edges of side surface plate section 5X, thereby being capable of enhancing rigidity.

In addition, bind bar 5 is configured to be able to blow a cooling gas through side surface plate section 5X by providing air blowing openings 5D on the inside of side surface plate section 5X except for the outer perimeter part. Illustrated bind bar 5 has air blowing openings 5D on almost the entire side surface plate section 5X. Bind bar 5 has rectangular perimeter plate section 5E on the outer perimeter part of side surface plate section 5X, and air blowing openings 5D are formed inside of perimeter plate section 5E. In addition, side surface plate section 5X in FIG. 2 is configured such that rectangular perimeter plate section 5E is vertically connected by multiple rows of connection bars 5F to reinforce perimeter plate section 5E. Illustrated bind bar 5 has, inside perimeter plate section 5E, air blowing openings 5D formed by dividing perimeter plate section 5E into a plurality of regions by multiple rows of connection bars 5F that vertically connect perimeter plate section 5E. The multiple rows of connection bars 5F are disposed in the stacking direction of battery stack 9 so as to be parallel to one another with a space therebetween. In addition, in the power supply device illustrated in FIG. 12, connection bar 5F of bind bar 5 is guided into longitudinal channel 34 defined by vertical walls 31 and 32 of separator 2. Thus, a short circuit between connection bars 5F of bind bar 5 and battery cells 1 can effectively be prevented.

In a state where side surface plate section 5X of bind bar 5 described above is disposed on the side surface of battery stack 9, perimeter plate section 5E is disposed outside side walls 23 of separators 2, lower-end bent section 5A is disposed on the lower surfaces of bottom surface connecting sections 41 of separators 2, and upper-end bent section 5B is disposed on the upper surfaces of corner connecting sections 42 of separators 2. Bind bar 5 is positioned such that the inner surface of perimeter plate section 5E is in contact with the projections formed on side walls 23, the inner surface of lower-end bent section 5A is in contact with the projecting strips formed on bottom surface connecting sections 41, and the inner surface of upper-end bent section 5B is in contact with projecting strips formed on corner connecting sections 42.

(Packing 11)

In addition, the power supply device is provided with packings 11 between bind bars 5 and battery stack 9 as illustrated in FIGS. 2 and 4. Packing 11 has a sheet shape, and can be manufactured by vacuum forming a single resin sheet, and then, cutting the resultant sheet, or manufactured by forming a thermoplastic resin into a sheet having a predetermined three-dimensional shape by an injection molding process or the like. Packing 11 illustrated in FIGS. 2 and 4 is formed into a shape having planar part 11A that is in planar contact with the inner surface of bind bar 5 and hollow elastic protruding part 11B that protrudes from planar part 11A toward the surface of battery stack 9 and extends to entirely cover air blowing openings 5D in bind bar 5. Sheet-shaped packing 11 prevents leakage of a cooling gas between bind bar 5 and battery stack 9 in such a manner that planar part 11A is brought into close contact with the inner surface of bind bar 5 and elastic protruding part 11B is elastically brought into close contact with the surface of battery stack 9.

Sheet-shaped packing 11 prevents leakage of a cooling gas in such a manner that planar part 11A is disposed on inner surfaces of perimeter plate section 5E, lower-end section 5A, and upper-end bent section 5B, and elastic protruding part 11B disposed to face perimeter plate section 5E is elastically pressed against the surface of battery stack 9 to close the gap between bind bar 5 and battery stack 9, that is, the gap between perimeter plate section 5E and separators 2. As illustrated in an enlarged view in FIG. 4, sheet-shaped packing 11 is formed by shaping an elastically deformable resin sheet such that planar part 11A is connected to both ends of elastic protruding part 11B which has a U-channel-shaped transverse cross section.

(End Separator 12)

Illustrated power supply device 100 also has, at both ends and at the intermediate part of battery stack 9, end separators 12 having insulating property between end plate 4 and battery cell 1 disposed inside end plate 4 and between intermediate bracket 6 and battery cells 1 disposed on both surfaces of intermediate bracket 6. This structure enables metal end plate 4 and battery cell 1 provided with metal external case 1a to be stacked on each other while insulating them from each other by end separator 12. As illustrated in FIGS. 2 and 3, end separator 12 is disposed between battery stack 9 and end plate 4 to insulate metallic end plate 4 from battery cell 1.

In addition, end separator 12 disposed on a side of second main surface 1Xb of battery cell 1 is provided with oppositely extending side wall 25 protruding to be engaged with cutout 24 on facing separator 2, like separator 2 described above. Thus, battery cell unit 10 in which second main surface 1Xb faces end plate 4 or intermediate bracket 6 can be covered without causing cutout 24 thereof to be exposed. In addition, end separator 12 disposed on the side of second main surface 1Xb of battery cell 1 is formed with second air blowing channel 30B for forming air passage 8 between end separator 12 and battery cell 1 facing end separator 12.

(Bus Bar 7)

Battery cells 1 constituting battery stack 9 are connected such that positive and negative electrode terminals 13 are respectively connected to each other in series by bus bars 7. The power supply device obtained by connecting battery cells 1 in series can increase an output voltage. However, the power supply device can also increase current capacity by connecting battery cells in parallel.

(Air Blowing Duct 51)

Power supply device 100 is provided with a pair of air blowing ducts 51 on both sides thereof for forcibly blowing a cooling gas into air passage 8 formed between battery cell 1 and separator 2, and forced air blowing mechanism 52 is connected to air blowing ducts 51, as illustrated in FIG. 1. Power supply device 100 cools battery cells 1 by forcibly blowing a cooling gas to air passages 8 from air blowing ducts 51. It is to be noted that power supply device 100 can heat battery cells 1 by forcibly blowing a heated gas to air passages 8 from air blowing ducts 51.

Air blowing duct 51 includes inlet duct 51A and discharge duct 51B. Inlet duct 51A and discharge duct 51B are provided on opposite sides, and a cooling gas is blown to inlet duct 51A from air passages 8 and to discharge duct 51B from air passages 8, to cool battery cells 1. A plurality of air passages 8 is connected in parallel with inlet duct 51A and discharge duct 51B. Therefore, a cooling gas blown to inlet duct 51A is distributed to a plurality of air passages 8 and is blown to discharge duct 51B from inlet duct 51A. Since power supply device 100 illustrated in FIG. 1 has inlet duct 51A and discharge duct 51B on both sides, air passages 8 are formed to extend horizontally. The cooling gas is horizontally blown to air passages 8 for cooling battery cells 1. The shape of the air blowing duct is not limited to the shape illustrated in FIG. 1. The air blowing duct can be provided along the direction parallel to air passages 8.

(Forced Air Blowing Mechanism 52)

Forced air blowing mechanism 52 has a fan rotated by a motor, the fan being connected to air blowing duct 51. Power supply device 100 is configured such that, for example, forced air blowing mechanism 52 is connected to inlet duct 51A to forcibly blow the cooling gas to inlet duct 51A from forced air blowing mechanism 52. Power supply device 100 cools battery cells 1 by forcibly blowing the cooling gas through forced air blowing mechanism 52→inlet duct 51A→air passages 8→discharge duct 51B. Note that the forced air blower may be connected to the discharge duct. This forced air blower forcibly suctions a cooling gas from the discharge duct and exhausts the suctioned gas. Therefore, the power supply device cools the battery cells by blowing a cooling gas through inlet duct→air passages→discharge duct→forced air blower.

(Power Supply System)

Figure 15:
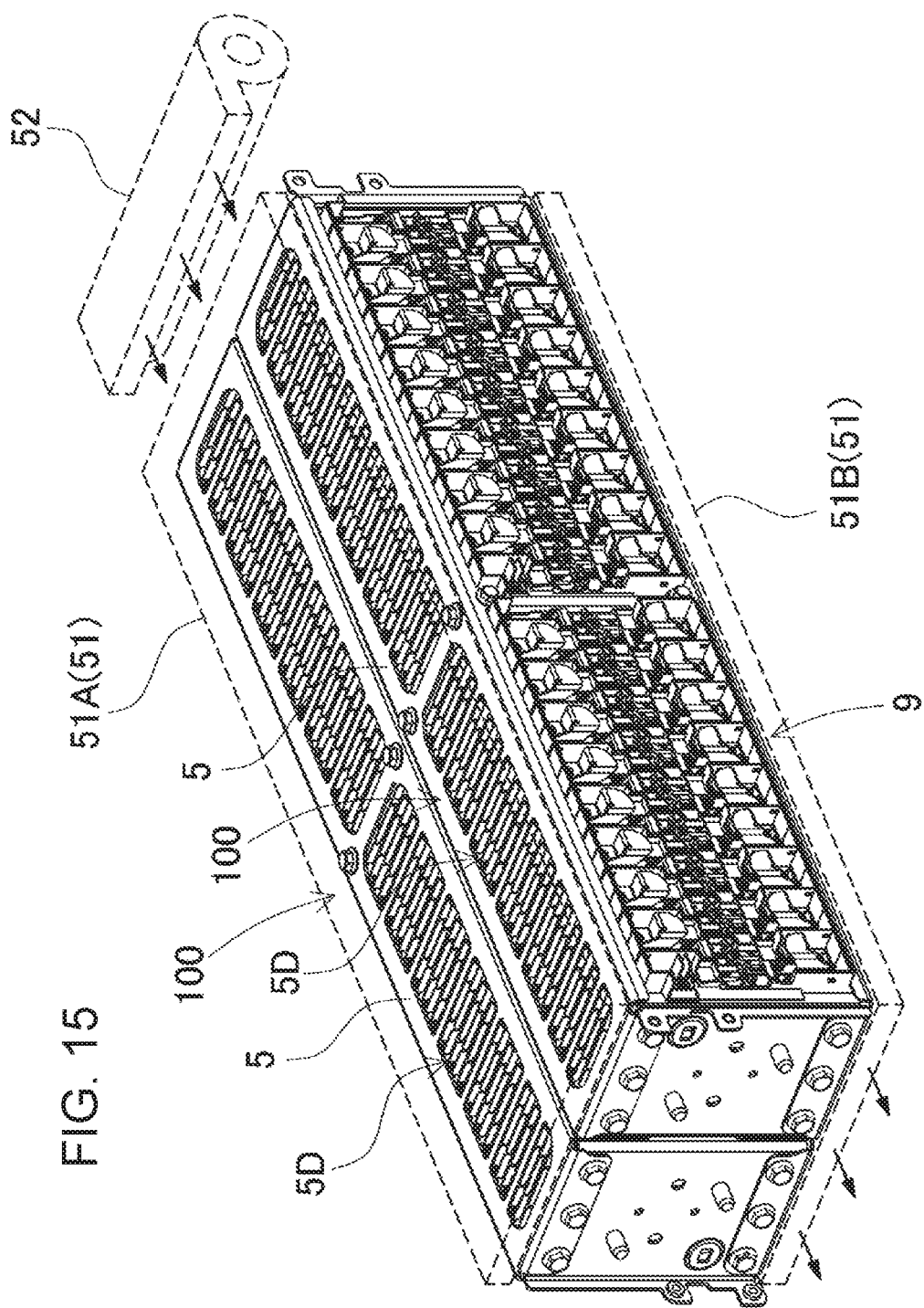
FIG. 15 is a perspective view of a power supply system according to one exemplary embodiment of the present invention.

FIG. 15 illustrates an example where power supply device 100 illustrated in FIG. 1 is disposed in a horizontal position where both side surfaces of battery stack 9 are vertically directed. FIG. 15 illustrates a power supply system provided with a pair of power supply devices 100. In the power supply system illustrated in FIG. 15, each power supply device 100 is turned from the position illustrated in FIG. 1 to a horizontal position such that the top surface of each battery cell 1 provided with positive and negative electrode terminals 13 is horizontally directed. In addition, in the power supply system, a pair of power supply devices 100 is disposed such that the bottom surfaces thereof face each other and the top surfaces of battery stacks 9 are horizontally directed in opposite directions.

Figure 16:
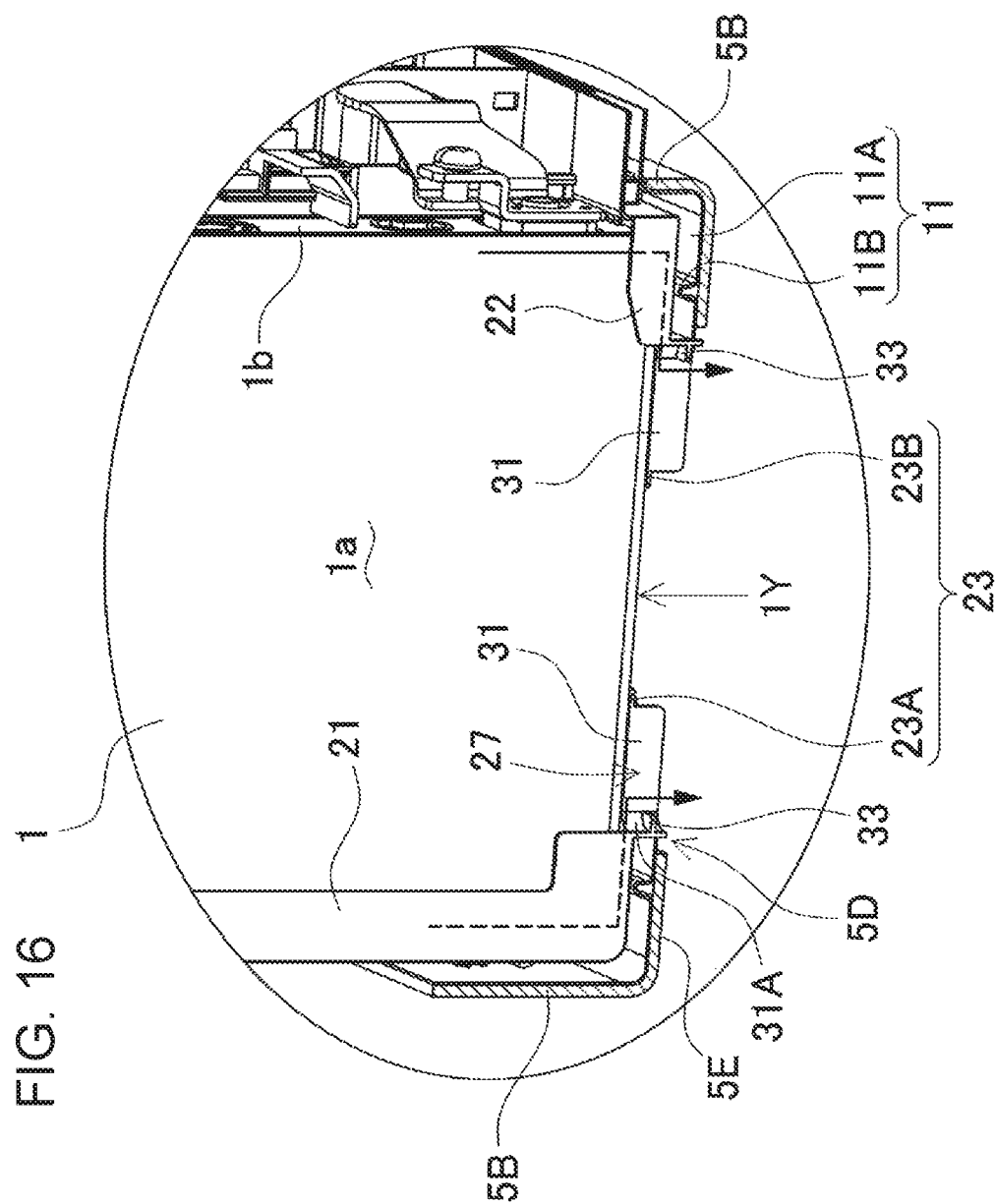
FIG. 16 is a perspective sectional view of the power supply system illustrated in FIG. 15.
Figure 17:
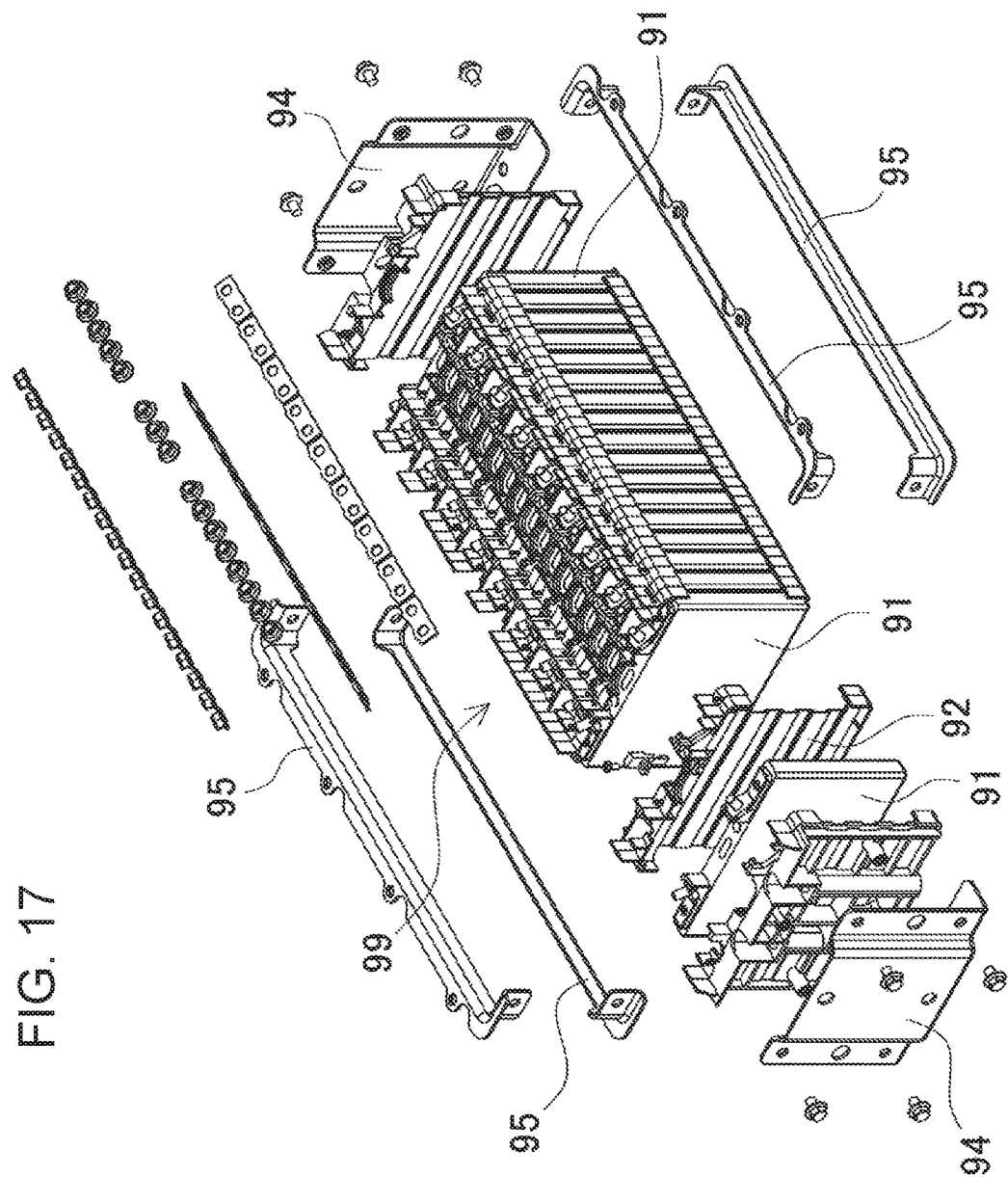
FIG. 17 is an exploded perspective view of a conventional power supply device.

The power supply system having power supply devices 100 in the position described above is disposed in the position where both side surfaces of battery stacks 9 are vertically directed, so that, as illustrated in FIG. 16, side wall 23 of separator 2 disposed to face side surface 1Y of each battery cell 1 is on the lower surface of power supply device 100 illustrated in FIG. 15. Side wall 23 is provided with vertical walls 31 extending in the longitudinal direction, and these vertical walls 31 are disposed to be exposed downward from air blowing openings 5D on bind bar 5. Power supply device 100 has a structure of causing condensed water generated on the surface of battery cell 1 to flow downward to side surface 1Y of battery cell 1 which is on the lower surface side. In this case, side surface 1Y of battery cell 1 on the lower surface side is covered such that the corner of the bottom surface of external case 1a is covered by box-shaped covering section 21 and corner 1S on a side of sealing plate 1b is covered by corner covering section 22. Thus, leakage of water droplets from these portions is prevented, and therefore, direct contact of water droplets with bind bar 5 can be prevented. In addition, side wall 23 formed on the side surface of box-shaped covering section 21 and corner covering section 22 extends toward the intermediate part of battery cell 1, whereby condensed water flows down along vertical walls 31 formed continuously with side wall 23 as indicated by an arrow in FIG. 16. Accordingly, the creepage distance can be increased to improve insulating property. Furthermore, illustrated side wall 23 has rib 33 formed on vertically the intermediate part of curved part 31A formed on the boundary between side surface covering parts 21C and 22C and longitudinal side wall 26, whereby the creepage distance is further increased by rib 33.

The power supply system described above is provided with a pair of air blowing ducts 51 above and below a pair of power supply devices 100, which is connected to each other with bottom surfaces facing each other, for forcibly blowing a cooling gas to air passages 8 formed between battery cell 1 and separator 2, and forced air blowing mechanism 52 is connected to these air blowing ducts 51, as illustrated in FIG. 15. This power supply system also cools battery cells 1 by forcibly blowing a cooling gas to air passages 8 from air blowing ducts 51. In the illustrated power supply system, inlet duct 51A is disposed above power supply devices 100 arranged in two rows, and discharge duct 51B is disposed below these power supply devices 100. This structure enables a cooling gas to flow through a plurality of air passages 8, which are vertically arranged between battery cell 1 and separator 2, from top to bottom to cool battery cells 1. Therefore, this structure has a feature of causing condensed water generated, for example, due to dew condensation to quickly flow down along air passages 8 to be discharged. Specifically, in the power supply system having the structure described above, discharge duct 51B disposed on the lower side can also be used as a drain duct for condensed water or the like. Note that the power supply system can be configured such that the inlet duct is disposed below the power supply devices and the discharge duct is disposed above the power supply devices.

While FIG. 15 illustrates an example of the power supply system in which power supply device 100 is turned to be in a horizontal position from the position illustrated in FIG. 1 such that the top surface of each battery cell 1 is horizontally directed and a pair of power supply devices 100 are disposed with bottom surfaces facing each other, a power supply system provided with a plurality of power supply devices can be disposed such that the power supply devices in a position illustrated in FIG. 1 are horizontally arranged parallel to each other in two rows or vertically arranged parallel to each other in two layers, although not illustrated.

The power supply device and the power supply system described above are used for various purposes, such as a power supply mounted on a powered vehicle such as a hybrid car or an electric vehicle for supplying power to a travel motor, a power supply for storing power generated by natural energy such as photovoltaic power generation or wind-power generation, or a power supply for storing night power, and are particularly used as a power supply preferable for large power and large current.

Exemplary embodiments and examples of the present invention have been described with reference to the drawings. The exemplary embodiments and examples show devices for embodying the technical ideas of the present invention. The present invention is not limited to the above-mentioned devices. In the present description, members shown in the scope of claims are not limited to the members of the exemplary embodiments. Especially, the sizes, materials, and shapes of the components and relative arrangement between the components, which are described in the exemplary embodiments, do not limit the scope of the present invention but are simply explanation examples as long as there is no specific description. The sizes and the positional relation of the members in each drawing are sometimes exaggerated for clearing the explanation. Furthermore, in the above-mentioned explanation, the same names or the same reference marks denote the same members or same-material members, and detailed description is appropriately omitted.

Furthermore, regarding the elements constituting the present invention, a plurality of elements may be formed of the same member, and one member may serve as the plurality of elements. Conversely, the function of one member may be shared by the plurality of members.

The battery system according to the present invention is optimally used for a power supply device that supplies power to a motor of a vehicle which requires large power or a power storage device that stores natural energy or night power.

The invention claimed is:

1. A power supply device comprising:
a plurality of battery cells, each of which has a prismatic external form with a thickness smaller than a width of a main surface;
a plurality of separators, each of which is connected to a respective battery cell of the plurality of battery cells for covering at least a portion of a surface of the respective battery cell; and
a fastening member that fastens a battery stack constructed by stacking the plurality of battery cells, each of the battery cells being covered by a respective separator of the plurality of separators in a state where the main surfaces face each other, wherein
each of the separators is formed from an insulating material which is elastically deformable, and
each of the separators has:
a main plate section that covers the main surface of the respective battery cell disposed to face the main plate section;
a box-shaped covering section provided on a bottom part of the main plate section on a first surface side of the main plate section for receiving and covering a bottom surface of the respective battery cell, the box-shaped covering section having a bottom surface covering part formed along a lower edge of the main plate section to protrude toward the first surface side, a front surface covering part rising upward from a leading end of the bottom surface covering part, and side surface covering parts connecting ends of the main plate section, the bottom surface covering part, and the front surface covering part; and
a corner covering section provided on a top part of the main plate section on the first surface side for covering a corner of a top surface of the respective battery cell.

2. The power supply device according to claim 1, wherein
a battery cell unit is formed by attaching each of the separators on a fixed position of the respective battery cell with the bottom surface of the respective battery cell being inserted into the box-shaped covering section of each of the respective separators and the corner of the top surface of the respective battery cell being covered by the corner covering section, and
the battery stack is formed by stacking a plurality of the battery cell units.

3. The power supply device according to claim 1, wherein
each of the separators further has a side wall for defining side surfaces of the box-shaped covering section and the corner covering section on a side surface of the main plate section on the first surface side, and
the side wall is formed with a cutout at an intermediate part of the side wall.

4. The power supply device according to claim 3, wherein
each of the separators is provided with a first air blowing channel, on a first surface of the main plate section, for forming an air passage between the battery cells stacked on the first surface side of the main plate section and the main plate section, and openings on both ends of the first air blowing channel communicate with the cutout.

5. The power supply device according to claim 3, wherein each of the separators is provided with a second air blowing channel, on a second surface of the main plate section opposite to the first surface, for forming an air passage between each of the battery cells stacked on the second surface side of the main plate section and the main plate section, and openings on both ends of the second air blowing channel are formed along the side wall.

6. The power supply device according to claim 5, wherein the main plate section is provided with an oppositely extending side wall extending toward the second surface along the cutout, and the oppositely extending side wall is formed into a shape engageable with the cutout of an adjacently disposed separator.

7. The power supply device according to claim 6, wherein the side wall has a vertical wall along a longitudinal direction, and the oppositely extending side wall has a vertical wall along a longitudinal direction.

8. The power supply device according to claim 7, wherein the fastening member has a pair of end plates disposed on both end faces of the battery stack and a bind bar having both ends connected to the pair of end plates, the bind bar has a side surface plate section for covering a side surface of the battery stack, the side surface plate section being formed with an air blowing opening facing an opening of the air passage, and the vertical walls formed on the side wall and the oppositely extending side wall are disposed in the air blowing opening.

9. The power supply device according to claim 8, wherein the side wall and the oppositely extending side wall each have two rows of vertical walls on positions facing each other, the two rows of vertical walls facing each other defining a continuous longitudinal channel, the bind bar is provided with a connection bar for reinforcing the side surface plate section having the air blowing opening, the side surface plate section being formed with a plurality of the air blowing openings through the connection bar, and the connection bar is inserted into the longitudinal channel.

10. The power supply device according to claim 1, further comprising insulating cover films, each of which partially covers a respective battery cell, each of the insulating cover films extending at least from a surface of the respective battery cell covered by the box-shaped covering section to a surface of the respective battery cell covered by the corner covering section, on the respective battery cell covered by each of the respective separators.

11. The power supply device according to claim 1, wherein the power supply device is disposed in a horizontal position where both side surfaces of the battery stack are vertically directed.

12. A power supply system comprising a plurality of the power supply devices according to claim 1, the power supply system comprising at least a pair of the power supply devices, each of which is disposed in a horizontal position where both side surfaces of the battery stack are vertically directed, the pair of power supply devices being disposed such that bottom surfaces of the battery stacks face each other and the top surfaces of the battery cells are horizontally directed in opposite directions.

13. A plurality of separators used for a power supply device constructed by stacking a plurality of battery cells, each of the battery cells having a prismatic external form with a thickness smaller than a width of a main surface, each respective separator of the plurality of separators for insulating a surface of a respective battery cell of the plurality of battery cells, each of the separators comprising:

a main plate section that covers the main surface of the respective battery cell disposed to face the main plate section;

a box-shaped covering section provided on a bottom part of the main plate section on a first surface side of the main plate section for receiving and covering a bottom surface of the respective battery cell, the box-shaped covering section having a bottom surface covering part formed along a lower edge of the main plate section to protrude toward the first surface side, a front surface covering part rising upward from a leading end of the bottom surface covering part, and side surface covering parts connecting ends of the main plate section, the bottom surface covering part, and the front surface covering part; and a corner covering section provided on a top part of the main plate section on the first surface side for covering a corner of a top surface of the respective battery cell, wherein each of the separators is formed from an insulating material which is elastically deformable.

* * * * *